US009262824B2

(12) United States Patent
Pagel et al.

(10) Patent No.: US 9,262,824 B2
(45) Date of Patent: Feb. 16, 2016

(54) ASSESSMENTS OF VASCULAR PERMEABILITY FOR BIOMEDICAL IMAGING STUDIES

(71) Applicant: Arizona Board of Regents on Behalf of the University of Arizona, Tuscon, AZ (US)

(72) Inventors: Mark D. Pagel, Tuscon, AZ (US); Julio Cardenas-Rodriguez, Tuscon, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 77 days.

(21) Appl. No.: 14/378,312

(22) PCT Filed: Jan. 15, 2013

(86) PCT No.: PCT/US2013/021583
§ 371 (c)(1),
(2) Date: Aug. 12, 2014

(87) PCT Pub. No.: WO2013/122710
PCT Pub. Date: Aug. 22, 2013

(65) Prior Publication Data
US 2015/0043793 A1 Feb. 12, 2015

Related U.S. Application Data

(60) Provisional application No. 61/633,549, filed on Feb. 13, 2012, provisional application No. 61/634,589, filed on Mar. 2, 2012.

(51) Int. Cl.
*G06K 9/00* (2006.01)
*G06T 7/00* (2006.01)

(52) U.S. Cl.
CPC ............. *G06T 7/0012* (2013.01); *G06T 7/0016* (2013.01); *G06T 2207/10096* (2013.01)

(58) Field of Classification Search
CPC .................... G06K 9/00496; G06K 2017/009; G06T 7/0012; G06T 7/0016; G06T 2207/10096; G06F 19/321; G06F 19/34; G06F 19/366; G01R 33/4806; A61B 5/00; A61B 5/0073; A61K 49/00; A61K 49/0002; A61K 49/0004; A61K 49/0065; A61K 51/00; A61K 51/0455; Y10T 436/24
See application file for complete search history.

(56) References Cited

U.S. PATENT DOCUMENTS

| 5,287,273 A  * | 2/1994 | Kupfer .................. G06F 19/366 250/303 |
| 8,463,552 B1 * | 6/2013 | Black ...................... G06F 19/34 250/281 |

(Continued)

OTHER PUBLICATIONS

International Search Report for PCT/US2013/021583, mailed Apr. 26, 2013.

(Continued)

*Primary Examiner* — Jose Couso
(74) *Attorney, Agent, or Firm* — McDonnell Boehnen Hulbert & Berghoff LLP

(57) ABSTRACT

Described herein are methods and systems for analyzing biomedical images using new models. Example models include a linear reference region model and a reference agent model. In one example aspect, a computer-implemented method is provided. The method may involve determining, based on a set of biomedical images, a first concentration-activity curve and a second concentration activity-curve. Additionally, the method may further include determining a value of at least one pharmacokinetic (PK) parameter based on the first concentration-activity curve and the second concentration-activity curve and a linear model that relates the first concentration-activity curve to the second concentration-activity curve. The value of the at least one PK parameter may be determined based on application of a linear least square fitting algorithm to the linear model. Also, the method may include causing a graphical display to provide a visual indication of the value of the at least one PK parameter.

20 Claims, 16 Drawing Sheets

(56) References Cited

U.S. PATENT DOCUMENTS

| | | | | |
|---|---|---|---|---|
| 8,652,440 | B2* | 2/2014 | Ichise | A61K 49/0004 424/1.11 |
| 8,795,628 | B2* | 8/2014 | Gambhir | B82Y 30/00 424/1.11 |
| 2010/0196274 | A1* | 8/2010 | Ichise | A61K 49/0004 424/1.81 |
| 2011/0230760 | A1* | 9/2011 | Gambhir | A61B 5/0071 600/431 |
| 2014/0229115 | A1* | 8/2014 | Ichise | A61K 49/0004 702/19 |

OTHER PUBLICATIONS

Masanori Ichise, et al., (2003) "Linearized Reference tissue parametric imaging methods: application to [11C] DASB positron emission tomography studies of the serotonin transporter in human brain," Journal of Cerebral Blood Flow & Metabolism, p. 1096-1112.

Ahearn, et al., "The use of the Levenberg Marquardt curve-fitting algorithm in pharmacokinetic modeling of DCE-MRI data," Phys Med Biol 2005; 50N:85-N92.

Brix, et al., "Pharmacokinetic parameters in CNS, Cd-DTPA enhanced MR imaging," Comput Assist Tomogr 1991; 15:621-628.

Di Giovanni, et al., "The accuracy of pharmacokinetic parameter measurement in DCE-MRI of the breast at 3 T," Phys Med Biol2010; 55:121-132.

Fluckiger, et al., "Model-based blind estimation of kinetic parameters in dynamic contrast enhanced (DCE)-MRI," Magn Reson Med 2009; 62:1477-1486.

Hayes, et al., "Assessing changes in tumor vascular function using dynamic contrast-enhanced magnetic resonance imaging," NMR Biomed 2002; 15:154-163.

Heisen, et al., "The use of a reference tissue arterial input function with low-temporal resolution DCE-MRI data," Phys Med Biol 2010; 55:4871-4883.

Henderson, et al., "Temporal sampling requirements for the tracer kinetics modeling of breast disease," Magn Reson Imaging 1998; 16:1057-1073.

Hylton, "Dynamic contrast-enhanced magnetic resonance imaging as an imaging biomarker," J Clin Oneal 2006. 24:3293-3298.

Kovar, et al., "A new method for imaging perfusion and contrast extraction fraction: input functions derived from reference tissues," J Magn Reson Imaging 1998; 8:1126-34.

Larsson, et al., "Quantitation of blood-brain barrier defect by magnetic resonance imaging and gadolinium-DTPA in patients with multiple sclerosis and brain tumors," Magn Reson Med 1990; 16:117-131.

Lee, et al. "An analysis of the pharmacokinetic parameter ratios in DCE-MRI using the reference region model," Magn Reson Imaging 2012; 30:26-35.

Medved, et al., "Semiquantitative analysis of dynamic contrast enhanced MRI in cancer patients: Variability and changes in tumor tissue over time," J Magn Reson Imaging, 2004; 20:122-128.

Murase, "Efficient method for calculating kinetic parameters using T-1-weighted dynamic contrast-enhanced magnetic resonance imaging," Magn Reson Med 2004; 51:858-862.

O'connor, et al., "DCE-MRI biomarkers in the clinical evaluation of antiangiogenic and vascular disrupting agents," Br J Cancer 2007; 96:189-195.

Padhani, et al. "Reproducibility of quantitative dynamic MRI of normal human tissues," NMR Biomed, 2002;15:143-153.

Parker, et al., "Experimentally-derived functional form for a population-averaged high-temporal-resolution arterial input function for dynamic contrast-enhanced MRI," Magn Reson Med 2006; 56:993-1000.

Planey, et al., "Temporal sampling requirements for reference region modeling of DCE-MRI data in human breast cancer," J Magn Reson Imaging 2009; 30:121-134.

Tofts, et al. "Estimating kinetic parameters from dynamic contrast-enhanced T-1-weighted MRI of a diffusible tracer: Standardized quantities and symbols," J Magn Reson Imaging 1999; 10:223-232.

Tofts, et al., "Measurement of the blood-brain barrier Permeability and leakage space using dynamic MR imaging: 1. Fundamental concepts," Magn Reson Med 1991, 17:357-367.

Yang C, et al., "Estimating the arterial input function using two reference tissues in dynamic contrast-enhanced MRI studies: Fundamental concepts and simulations," Mag Reson Med 2004; 52:1110-1117.

Yang X, et al., "Improving the pharmacokinetic parameter measurements in dynamic contrast-enhanced MRI by use of the arterial input function: Theory and clinical application," Magn Reson Med 2008, 59; 1448-145.

Yankeelov, et al., "Dynamic Contrast Enhanced Magnetic Resonance Imaging in Oncology:Theory, Data Acquisition, Analysis, and Examples," Current medical imaging reviews 2007; 3:91-107.

Yankeelov, et al., "Quantitative pharmacokinetic analysis of DCE-MRI data without an arterial input function: a reference region model," Magn Reson Imaging 2005; 23:519-529.

* cited by examiner

ASSESSMENTS OF VASCULAR PERMEABILITY FOR BIOMEDICAL IMAGING STUDIES

RELATED APPLICATIONS

This application is a U.S. National Phase of International Application No. PCT/US2013/021583, filed Jan. 15, 2013, which claims priority to U.S. Provisional Application No. 61/633,549, filed Feb. 13, 2012; and U.S. Provisional Application No. 61/634,589, filed Mar. 2, 2012, the disclosures of which are hereby incorporated by reference in their entireties.

STATEMENT OF U.S. GOVERNMENT INTEREST

This invention was made with government support under P30 CA023074 awarded by the National Cancer Institute at the National Institutes of Health, and W81XWH-10-1-0188 awarded by the U.S. Army Medical Research and Material Command. The government has certain rights in the invention.

FIELD OF THE INVENTION

The disclosure herein relates generally to processing biomedical images and, in particular, to methods and systems for assessing vascular permeability and flow using biomedical images.

BACKGROUND

Biomedical imaging techniques can be used to assess physiological parameters of a tumor, organ, or other tissue of interest. For instance, biomedical imaging techniques can be used to estimate vascular permeability, the movement of fluids and molecules between vascular and extravascular compartments. Vascular permeability may characterize the ability of a blood vessel wall to allow for the flow of molecules (e.g., ions, nutrients, or water) or cells into or out of the blood vessel. Other examples of uses for biomedical imaging techniques may exist.

Current biomedical imaging techniques for assessing vascular permeability and flow are inadequate.

SUMMARY

Described herein are new methods and systems for analyzing biomedical images. In one example, methods and systems that may provide for improved speed of analysis and less sensitivity to both noise and temporal resolution are described. Such an example may enable the analysis of biomedical images obtained in a clinical setting. In another example, methods and systems are provided that involve estimation of the relative permeability and/or flow of two contrast agents within the same tissue of interest, advantageously eliminating some of the physiological variables that might otherwise affect the analysis.

In one example aspect, a computer-implemented method is provided. The method may involve determining, based on a set of biomedical images, a first concentration-activity curve and a second concentration activity-curve. Each of the first concentration-activity curve and the second concentration-activity curve may indicate a concentration of a respective contrast agent within a respective region of tissue. Additionally, the method may further include determining a value of at least one pharmacokinetic (PK) parameter based on the first concentration-activity curve and the second concentration-activity curve. Determining the value of the at least one PK parameter may include (i) determining a linear model, including the at least one PK parameter, that relates the first concentration-activity curve to the second concentration-activity curve and (ii) determining the value of the at least one PK parameter based on application of a linear least square fitting (LLSQ) algorithm to the linear model. Also, the method may include causing a graphical display to provide a visual indication of the value of the at least one PK parameter.

In another example aspect, a non-transitory computer-readable medium having instructions stored thereon is provided. The instructions may include determining, based on a set of biomedical images, a first concentration-activity curve and a second concentration activity-curve. Each of the first concentration-activity curve and the second concentration-activity curve may indicate a concentration of a respective contrast agent within a respective region of tissue. Additionally, the instructions may further include determining a value of at least one pharmacokinetic (PK) parameter based on the first concentration-activity curve and the second concentration-activity curve. Determining the value of the at least one PK parameter may include (i) determining a linear model, including the at least one PK parameter, that relates the first concentration-activity curve to the second concentration-activity curve and (ii) determining the value of the at least one PK parameter based on application of a linear least square fitting (LLSQ) algorithm to the linear model. Also, the instructions may include causing a graphical display to provide a visual indication of the value of the at least one PK parameter.

In a further aspect, a system comprising at least one processor, a non-transitory computer-readable medium, and program instructions stored on the non-transitory computer-readable medium is provided. The instructions may be executable by the at least one processor to determine, based on a set of biomedical images, a first concentration-activity curve and a second concentration-activity curve. Each of the first concentration-activity curve and the second concentration-activity curve may indicate a concentration of a respective contrast agent within a respective region of tissue. Additionally, the instructions may be executable to determine a value of at least one pharmacokinetic (PK) parameter based on the first concentration-activity curve and the second concentration-activity curve. Determining the value of the at least one PK parameter may include (i) determining a linear model, including the at least one PK parameter, that relates the first concentration-activity curve to the second concentration-activity curve and (ii) determining the value of the at least one PK parameter based on application of a linear least square fitting (LLSQ) algorithm to the linear model.

All embodiments of the invention disclosed herein can be combined with other embodiments or combinations of embodiments unless the context clearly dictates otherwise.

These as well as other aspects, advantages, and alternatives, will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that aspects of the present disclosure, as generally described herein, and illustrated in the figures, can be arranged, substituted, combined, separated, and/or designed in a wide variety of different configurations, all of which are explicitly contemplated herein.

Further, for illustration, certain aspects of the disclosure herein will be described with respect to magnetic resonance imaging. It should be understood, however, that part or all of the described systems and methods may apply equally to other types of biomedical imaging (e.g., optical imaging, ultrasound imaging, etc.). Therefore, the described embodiments should not be taken to be limiting.

I. EXAMPLE METHODS

Described herein are new methods and systems for analyzing models of phenomena that change biomedical images. For purposes of example and explanation, the methods and systems described herein may be used to determine the value of at least one pharmacokinetic (PK) parameter that is indicative of a perfusion, permeability, flow, extracellular volume fraction, or other physiological parameter of a tissue of interest (e.g., a tumor, muscle, organ, or other tissue). The determined value of the PK parameter may then be used to, for example, diagnose how the tissue of interest is responding to treatment, evaluate an abnormal condition of blood perfusion, or prognosticate an outcome, among other uses. Other aspects, uses, and advantageous of the methods and systems described herein are described further below.

Figure 1:
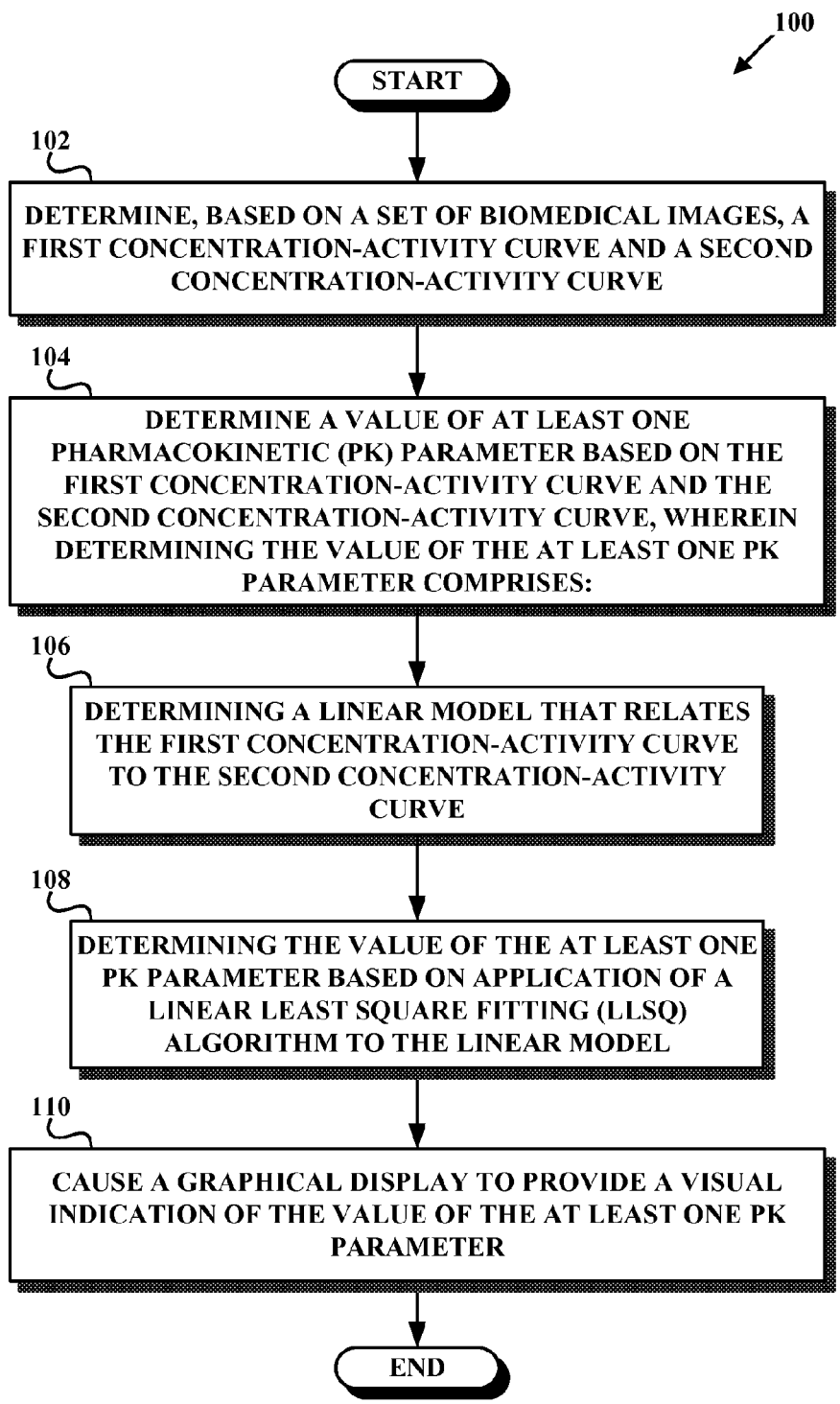
FIG. 1 is a flow chart of an example method for determining a value of one or more pharmacokinetic parameters.

With reference to FIG. 1, an example method 100 for determining a value of a PK parameter is described. As shown in FIG. 1, initially at block 102, the method 100 includes determine, based on a set of biomedical images, a first concentration-activity curve and a second-concentration activity curve. At block 104, the method 100 includes determine a value of at least one pharmacokinetic (PK) parameter based on the first concentration-activity curve and the second concentration-activity curve. Determining the value of the at least one PK parameter may include determining a linear model that relates the first concentration-activity curve to the second concentration-activity curve at block 106, and at block 108, determining the value of the at least one PK parameter based on application of a linear least squares (LLSQ) algorithm to the linear model. At block 110, the method 100 includes cause a graphical display to provide a visual indication of the value of the at least one PK parameter. These steps are explained in the following subsections.

Figure 16:
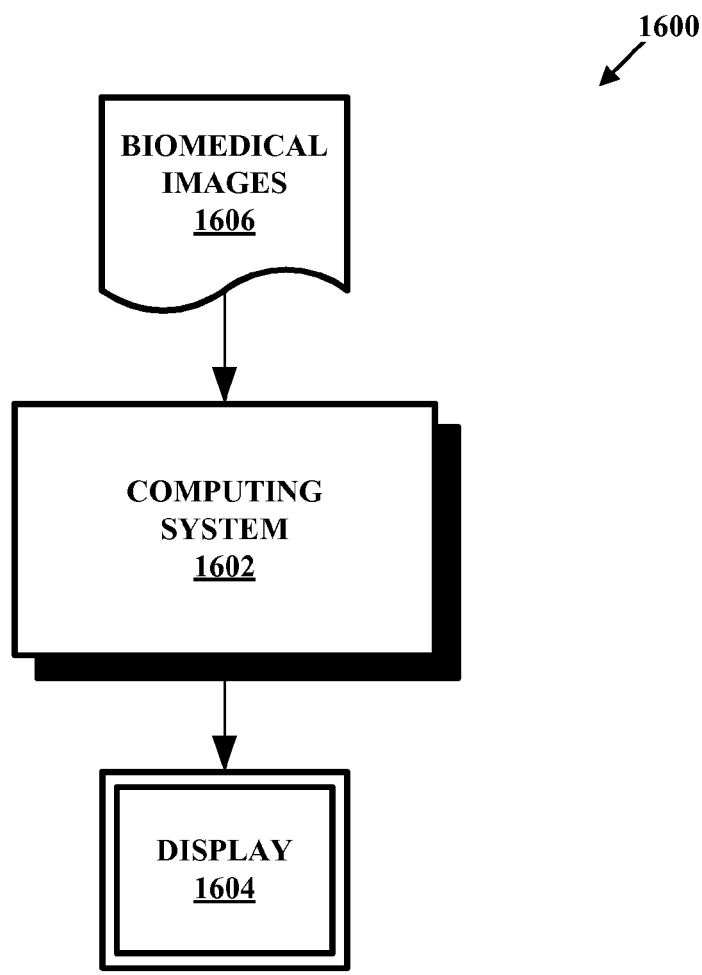
FIG. 16 is a simplified block diagram of an example system in which the present methods can be implemented.

Generally, the methods and functions described herein may be carried out by a computing system, such as computing system 1602 of FIG. 16 described further below. Again, however, it should be understood that the computing system 1602 of FIG. 16 is set forth for purposes of example and explanation only, and should not be taken to be limiting. The present methods and functions may just as well be carried out in other systems having other arrangements.

a. Determine Concentration-Activity Curves

At block 102, the method 100 includes determine, based on a set of biomedical images, a first concentration-activity curve and a second concentration-activity curve. Each of the first concentration-activity curve and the second concentration-activity curve may indicate a concentration of a respective contrast agent within a respective region of tissue.

In one example, the set of biomedical images may be a temporally dynamic series of biomedical images. The set of biomedical images may include any type of biomedical images or biomedical image data. For example, the set of biomedical images may be any type of MR images (e.g., F-MRI, DCE-MRI, $^{19}$F-DCE-MRI images), optical images, ultrasound images, positron emission tomography (PET) images, Computed Tomography images, or X-ray images, among other possibilities.

The respective contrast agent may be a substance used to enhance the contrast of structures or fluids within a body for medical imaging. The particular type of contrast agent may vary depending on the type of biomedical imaging technique used to obtain the biomedical images. In one case, the biomedical images may be MRI images, and the respective contrast agent may be a paramagnetic contrast agent. In another case, the biomedical images may be optical images, and the respective contrast agent may be a colored dye. In still another case, the biomedical images may be $^{19}$F-MRI images, and the respective contrast agent may be a nanoemulsion, such as a nanoemulsion that includes perfluorocarbons. In yet another case, the contrast agent may be a substance that is responsive to a biomarker. For instance, the contrast agent may be responsive to zinc ions or enzyme activities. Other examples also exist.

A concentration-activity curve may generally be data that indicates the concentration of a respective contrast agent as a function of time within a respective region of tissue (e.g., a voxel or group of voxels). As described further below, depending on the particular example, the first concentration-activity curve may indicate the concentration of the same contrast agent or different respective contrast agents. Additionally, as described below, the concentration-activity curves may indicate the concentration of a contrast agent within the same region of tissue or different respective regions of tissue.

Figure 2:
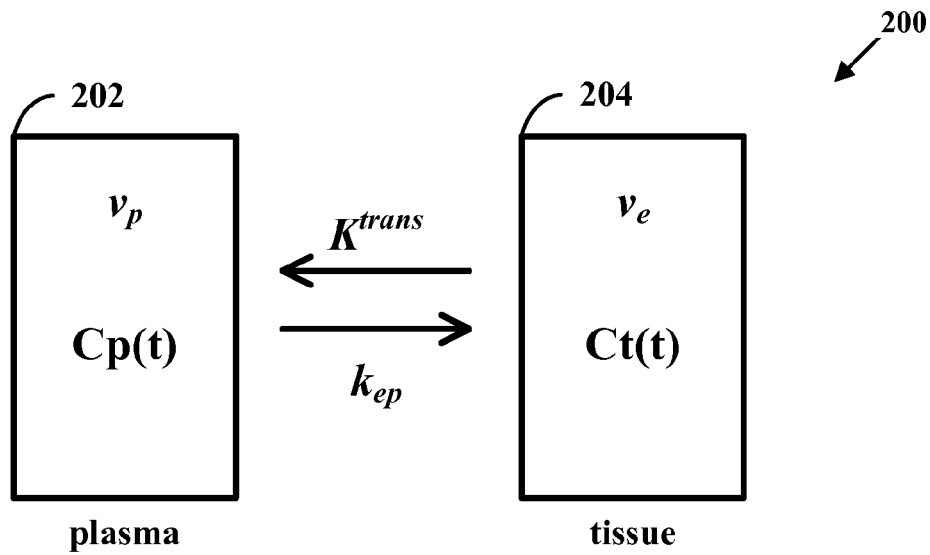
FIG. 2 is a conceptual illustration of an example model used for the quantitative analysis of biomedical image data.

Before turning to a more detailed description of the determination of a concentration-activity curve, a brief overview of modeling the pharmacokinetics of a contrast agent is provided with reference to FIG. 2. Such a model of the pharmacokinetics of a contrast agent may ultimately be used to generate a concentration-activity curve.

FIG. 2 is a conceptual illustration 200 of an example PK model used for the quantitative analysis of biomedical image data. Fitting concentration-curves to a PK model may be used to study the underlying physiology and/or pathology of an interest region of tissue, herein referred to as a tissue of interest (TOI). Parameters that describe the movement of a contrast agent across a vascular endothelium may include, for example: inflow rate from plasma to the TOI ($K^{trans}$), outflow rate from the TOI to plasma ($k_{ep}$), intravascular volume fraction ($v_p$), and extracellular-extravascular (EES) volume fraction ($v_e$).

PK models often make two assumptions. A first assumption is that a human body may be represented by one or more compartments, into and out of which a contrast agent dynamically flows. A second assumption is that each compartment is well-mixed such that a contrast agent entering a compartment is immediately distributed uniformly throughout the compartment.

The model shown in FIG. 2 is a two-compartment model including a central compartment 202 and peripheral compartment 204. Intravascular extracellular volume fraction (plasma) is considered to be the central compartment 202 and EES volume fraction (tissue) is considered to the peripheral compartment 204.

According to the model, a contrast agent may be introduced into the vasculature and diffuses into the EES in a reversible process characterized by a distribution rate constant ($K^{trans}$) and a redistribution rate constant ($k_{ep} = K^{trans}/v_e$). Equation 1 describes the process:

$$\frac{dCt(t)}{dt} = K^{trans} \cdot Cp(t) - \frac{K^{trans}}{v_e} \cdot Ct(t) \quad (1)$$

where Ct(t) is the concentration-activity curve for the tissue and Cp(t) is the concentration-activity curve in the plasma. The solution to Equation 1 is:

$$Ct(t) = K^{trans} \cdot \int_0^T Cp(t) \cdot e^{(-K^{trans}/v_e)\cdot(T-t)} dt \quad (2)$$

Equation 1 assumes that the tissue does not contain any vascular space, which may be correct for some tissues (e.g., muscle). However, in some examples, ignoring the fraction of vascular space ($v_p$) may lead to erroneous results. Including $v_p$ in the model increases accuracy and leads to the solution to Equation 1 shown by Equation 3:

$$Ct(t) = K^{trans} \cdot \int_0^T Cp(t) \cdot e^{(-K^{trans}/v_e)\cdot(T-t)} dt + v_p \quad (3)$$

In an example in which the biomedical images are DCE-MRI images, Equations 2 or 3 may be used to determine the first concentration-activity curve and the second concentration-activity curve. The concentration-activity curve for plasma, Cp(t), is referred to as the arterial input function (AIF), and may be challenging to determine Example approaches include taking arterial blood samples during acquisition of biomedical images or estimating the contrast agent concentration from biomedical imaging data when a large vessel is located in the same field of view of the analyzed tissue. A third example approach is to eliminate the need of measuring the AIF by using a second tissue, a reference region (RR), as a surrogate for the AIF. The third example approach, referred to as the RR model (RRM) is further described below.

In an example in which the biomedical images are optical images, the first concentration-activity curve and the second concentration-activity curve may be determined based on a pixel intensity value of a particular color or hue that corresponds to the color of a respective contrast agent. For instance, image processing may be used to determine the intensity of a particular color within a pixel or group of pixels within each image, and the intensity may be converted to a concentration of the contrast agent to determine a concentration-activity curve.

In an example in which a contrast agent is responsive to a biomarker, the first concentration-activity curve and the second concentration-activity curve may be determined based on changes in imaging signal, such as the MRI signal or the optical imaging signal, and whereby the biomarker-responsive agent changes the imaging signal at a different rate than the agent that is unresponsive to the biomarker but is responsive to the other conditions that also potentially affect the first biomarker.

b. Determine a Value of at Least One PK Parameter

At block 104, the method 100 includes determine a value of at least one PK parameter based on the first concentration-activity curve and the second concentration-activity curve. According to the method 100, determining the value of the at least one PK parameter may include determining a linear model that relates the first concentration-activity curve to the second concentration-activity curve at block 106, and at block 108, determining the value of the at least one PK parameter based on application of a linear least square fitting (LLSQ) algorithm to the model.

As described previously, the PK parameter may be a parameter that is indicative of perfusion, permeability, flow, extracellular volume fraction, or other physiological parameter of a tissue of interest. For instance, the PK parameter may include a volume transfer constant, an extravascular extracellular volume fraction, or a redistribution rate constant as described below, among other possibilities. Additionally, the PK parameter may be a parameter of a linear model that relates the first concentration-activity curve and the second concentration-activity curve. The characteristics and derivations of example linear models, including a linear reference region model (LRRM) and a reference agent model (RAM), are now described in detail.

i. Linear Reference Region Model (LRRM)

The LRRM is one example of a linear model that may be determined at block 106. LRRM is an improvement on the reference region model (RRM). Therefore, for purposes of example and explanation, a description of the RRM will first be described with reference to FIG. 3.

Figure 3:
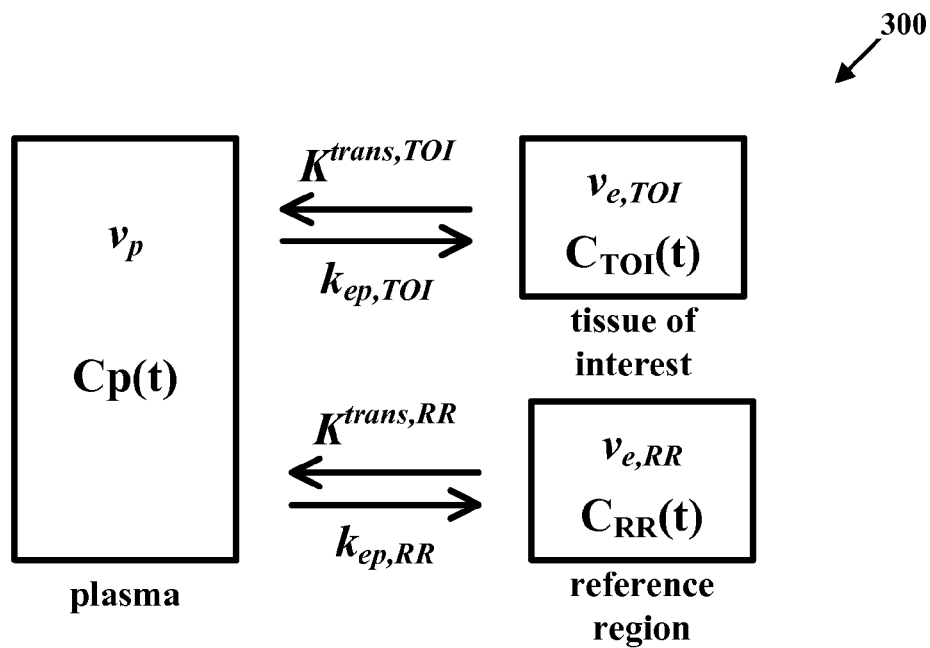
FIG. 3 is a conceptual illustration of another example model used for the quantitative analysis of biomedical image data.

FIG. 3 is a conceptual illustration 300 of another example model that may be used in some examples for the quantitative analysis of biomedical image data. As mentioned briefly above, the example model shown in FIG. 3 may be referred to as a reference region model (RRM), which eliminates the need of measuring the AIF by using a second tissue, a reference region (RR), as a surrogate for the AIF. According to the model, a contrast agent is introduced into the vasculature and diffuses into the EES of both a tissue of interest and a reference region of tissue in a reversible process. The process can be described by Equations 4 and 5:

$$\frac{dC_{TOI}(t)}{dt} = K^{trans,TOI} \cdot Cp(t) - \frac{K^{trans,TOI}}{v_{e,TOI}} \cdot C_{TOI}(t) \quad (4)$$

$$\frac{dC_{RR}(t)}{dt} = K^{trans,RR} \cdot Cp(t) - \frac{K^{trans,RR}}{v_{e,RR}} \cdot C_{RR}(t) \quad (5)$$

Equations 4 and 5 can be combined to yield an equation that does not require Cp(t) as an input:

$$C_{TOI}(t) = \frac{K^{trans,TOI}}{K^{trans,RR}} \cdot C_{RR}(t) + \frac{K^{trans,TOI}}{K^{trans,RR}} \cdot [k_{ep,RR} - k_{ep,TOI}] \cdot \int_0^T C_{RR}(t) \cdot e^{(-k_{ep,TOI})(T-t)} dt \quad (6)$$

The physiological interpretation for $K^{trans}$ varies depending on the balance between capillary permeability (PS) and blood flow (F) in the tissue of interest. For high permeability situations (PS>>F):

$$K^{trans} = F \cdot \rho \cdot (1 - Hct) \quad (7)$$

where ρ is the tissue density and Hct is the hematocrit. When the transport of the contrast agent is limited by permeability (PS<<F):

$$K^{trans} = PS \cdot \rho \quad (8)$$

In a third scenario, where contrast agent flux is limited by both flow and permeability:

$$K^{trans} = (e^{-PS/[F \cdot (1-Hct)]}) F \cdot \rho \cdot (1 - Hct) \quad (9)$$

Using a RR model (RRM) slightly relaxes the requirements on temporal sampling for acquisition of biomedical images by using the concentration of a contrast agent in a reference region as a surrogate for the AIF. Using the RRM, however, still involves previous knowledge or assumption of the volume transfer constant and extravascular extracellular volume, $K^{trans}$ and $v_e$ respectively, of the reference region. In some examples, such estimation may introduce systematic error into the determination of other PK parameters.

Another limitation of the RRM involves the use of a non-linear least squares (NLSQ) to estimate $K^{trans}$ and $v_e$ of the tissue of interest by fitting experimental concentration-activity curves to the RRM. In some examples, NLSQ fittings perform poorly under low signal-to-noise ratio (SNR) conditions that are typical in clinical studies. Further, NLSQ fittings are highly dependent on the initial estimates of the constants to be calculated. For example, for a heterogeneous tissue, the initial estimates may not apply to all regions of the tissue, which may lead to inaccurate fittings. Additionally, the time required to obtain a parametric map through voxel-wise calculations that use a NLSQ algorithm can often exceed one hour, which is impractical for most radiology clinics.

In order to overcome the limitations described above, a linear RRM (LRRM) that may be used with the current method 100 was developed. The LRRM is one example of a linear model that may be determined at block 106.

The RRM may be formulated in terms of ratios of $K^{trans,TOI}$ to $K^{trans,RR}$ (known as $R^{Ktrans}$), $K^{trans,TOI}$ to $v_{e,TOI}$ (known as $k_{ep,TOI}$), and $K^{trans,RR}$ to $v_{e,RR}$ (known as $k_{ep,RR}$). Calculating $R^{Ktrans}$, $k_{ep,TOI}$, and $k_{ep,RR}$ by applying a linear least squares (LLSQ) fitting algorithm to a linear RRM removes the need for an initial estimate of parameters. Using LLSQ can typically produce parametric maps within seconds, which can greatly facilitate the practical use of these algorithms, for example, in clinical settings. Fitting concentration-activity curves to a LRRM also leads to better performance compared to a using a NLSQ algorithm to fit concentration-activity curves to a non-linear RRM (NRRM). Additionally, using the LRRM described herein provides for more precise and accurate results under conditions of low SNR and/or slow temporal resolution than a NRRM.

Given the behavior of a contrast agent within a tissue of interest and a reference region, described by Equations 10 and 11:

$$\frac{dC_{TOI}(t)}{dt} = K^{trans,TOI} \cdot Cp(t) - K_{ep,TOI} \cdot C_{TOI}(t) \quad (10)$$

$$\frac{dC_{RR}(t)}{dt} = K^{trans,RR} \cdot Cp(t) - K_{ep,RR} \cdot C_{RR}(t) \quad (11)$$

it is possible to solve equation 11 for Cp(t), yielding $$Cp(t) = \frac{1}{K^{trans,RR}} \cdot \frac{dC_{RR}(t)}{dt} + \frac{1}{v_{e,RR}} \cdot C_{RR}(t) \quad (12)$$

Substituting Equation 12 into Equation 10 eliminates the dependence of Equation 10 on Cp(t) and yields Equation 13:

$$\frac{dC_{TOI}(t)}{dt} = K^{trans,TOI} \cdot \left[ \frac{1}{K^{trans,RR}} \cdot \frac{dC_{RR}(t)}{dt} + \frac{1}{v_{e,RR}} \cdot C_{RR}(t) \right] - k_{ep,TOI} \cdot C_{TOI}(t) \quad (13)$$

As previously mentioned, the solution to Equation 13 is:

$$C_{TOI}(t) = \frac{K^{trans,TOI}}{K^{trans,RR}} \cdot C_{RR}(t) + \frac{K^{trans,TOI}}{K^{trans,RR}} \cdot [k_{ep,RR} - k_{ep,TOI}] \cdot \int_0^T C_{RR}(t) \cdot e^{(-k_{ep,TOI})(T-t)} dt \quad (14)$$

and can be used to estimate the relative transfer constant of TOI compared to RR, $R^{Ktrans}$.

A LRRM can be derived by integrating both sides of Equation 13 and assuming that the initial concentration of the contrast agent in both tissues is equal to zero to obtain Equation 15:

$$C_{TOI}(t) = R^{Ktrans} \cdot C_{RR}(t) + \frac{K^{trans,TOI}}{v_{e,RR}} \cdot \int_0^T C_{RR}(t) dt - k_{ep,TOI} \cdot \int_0^T C_{TOI}(t) dt \quad (15)$$

Expressed in matrix form, Equation 14 is equal to:

$$\vec{A} = \overline{M} \cdot \vec{b} \quad (16)$$

where $$\vec{A} = \begin{pmatrix} C_{TOI}(T1) \\ C_{TOI}(T2) \\ \vdots \\ C_{TOI}(Tn) \end{pmatrix}; \quad (17)$$

$$\overline{M} = \begin{pmatrix} C_{RR}(T1) & \int_0^{T1} C_{RR}(t)dt & -\int_0^{T1} C_{TOI}(t)dt \\ C_{RR}(T2) & \int_0^{T2} C_{RR}(t)dt & -\int_0^{T2} C_{TOI}(t)dt \\ \vdots & \vdots & \vdots \\ C_{RR}(Tn) & \int_0^{Tn} C_{RR}(t)dt & -\int_0^{Tn} C_{TOI}(t)dt \end{pmatrix};$$

$$\vec{b} = \begin{pmatrix} R^{Ktrans} \\ K^{trans,TOI} \\ v_{e,RR} \\ k_{ep,TOI} \end{pmatrix}$$

If the elements of columns two and three of vector M are approximated by numerical integration, Equation 16 can be solved for the elements of b using conventional LLSQ. In one example, the application of a LLSQ algorithm of block 108, may include applying a LLSQ algorithm to the LRRM model described by Equations 15 and 16. For instance, applying the LLSQ to Equations 15 and 16 may yield the PK parameters of vector b of Equations 15 and 16.

$R^{Ktrans}$, $K^{trans,TOI}$, $K^{trans,RR}$, $k_{ep,TOI}$, and $v_{e,TOI}$, $v_{e,RR}$ are a examples of PK parameters that may be determined based on a linear model, the LRRM. In an example in which the LRRM is used as the linear model of the method 100, $C_{TOI}(t)$ and $C_{RR}(t)$ may be the first concentration-activity curve and the second concentration-activity curve. Thus, the first concentration-activity curve may indicate the concentration of a first contrast agent within an interest region of tissue, the TOI, and the second concentration-activity curve may indicate the concentration of the first contrast agent within a reference region of tissue, the RR.

ii. Simulation and Experimental Results Using LRRM

Computer simulations and experiments were performed to test the use of the LRRM in accordance with the method 100. Advantageously, the results indicated that using the LRRM is faster than the NRRM and relaxes requirements for temporal resolution and SNR. The simulation results and experimental results for the LRRM are described below. The simulation and experimental results are provided as examples. Other results are also possible and the results presented herein should not be taken to be limiting in any way.

Computer simulations were used to study the effect of injection speed, temporal resolution, and statistical noise on the accuracy and precision of LRRM and NRRM to estimate $R^{Ktrans}$ and $k_{ep,TOI}$. Three arterial input functions (AIFs) with three different injection speeds were simulated using Equation 18

$$C_p(t) = A \cdot t^B \cdot e^{(-t \cdot C)} + D \cdot [1 - e^{(-t \cdot E)}] \cdot e^{(-t \cdot F)} \quad (18)$$

and the following parameters for each speed: A) Fast 10-sec. injection speed, A=30.0 mM, B=1.0, C=4.00 min$^{-1}$, D=0.65 mM, E=5.0 min$^{-1}$; F=0.04 min$^{-1}$; B) Moderate 40-sec. injection speed, A=120.0 mM, B=3.0, C=4.34 min$^{-1}$, D=0.80 mM, E=1.0 min$^{-1}$, F=0.07 min$^{-1}$; C) Slow 80-sec. injection speed, A=55.0 mM, B=5.5, C=3.98 min$^{-1}$, D=0.80 mM, E=1.0 min$^{-1}$, F=0.07 min$^{-1}$ Each of the AIFs were calculated from t=0 to t=35 minutes at a temporal resolution of 1.0 seconds. A series of $C_{TOI}(T)$ and $C_{RR}(T)$ curves were then calculated using each AIF and Equation 19:

$$C_t(T) = K^{trans} \int_0^T C_p(t) \cdot e^{[-k_{ep} \cdot (T-t)]} dt \quad (19)$$

with $K^{trans}=0.25$ min$^{-1}$ and $k_{ep}=0.62$ min$^{-1}$ for the TOI curve and $K^{trans}=0.10$ min$^{-1}$ and $k_{ep}=1.00$ min$^{-1}$ for the RR curve.

To study systematic error, all the AIFs, $C_{TOI}(T)$, and $C_{RR}(T)$ were down sampled from their initial resolution of 1 second to a new resolution of 60 seconds in intervals of 1 second. Further, the AIF with the best performance in the systematic error analysis was used to study the combined effect of SNR and temporal resolution on the accuracy and precision of the LRRM and NRRM. To do so, all curves were recalculated at Δt=1, 10, 30, and 60 seconds. Also, Gaussian noise was added to produce SNRs from 5 to 50. Each simulation was then repeated 1000 times for each condition of SNR and Δt. The accuracy of parameters was evaluated in terms of the mean percentage error and the precision was evaluated in terms of the standard deviation of the percentage error.

Figure 4:
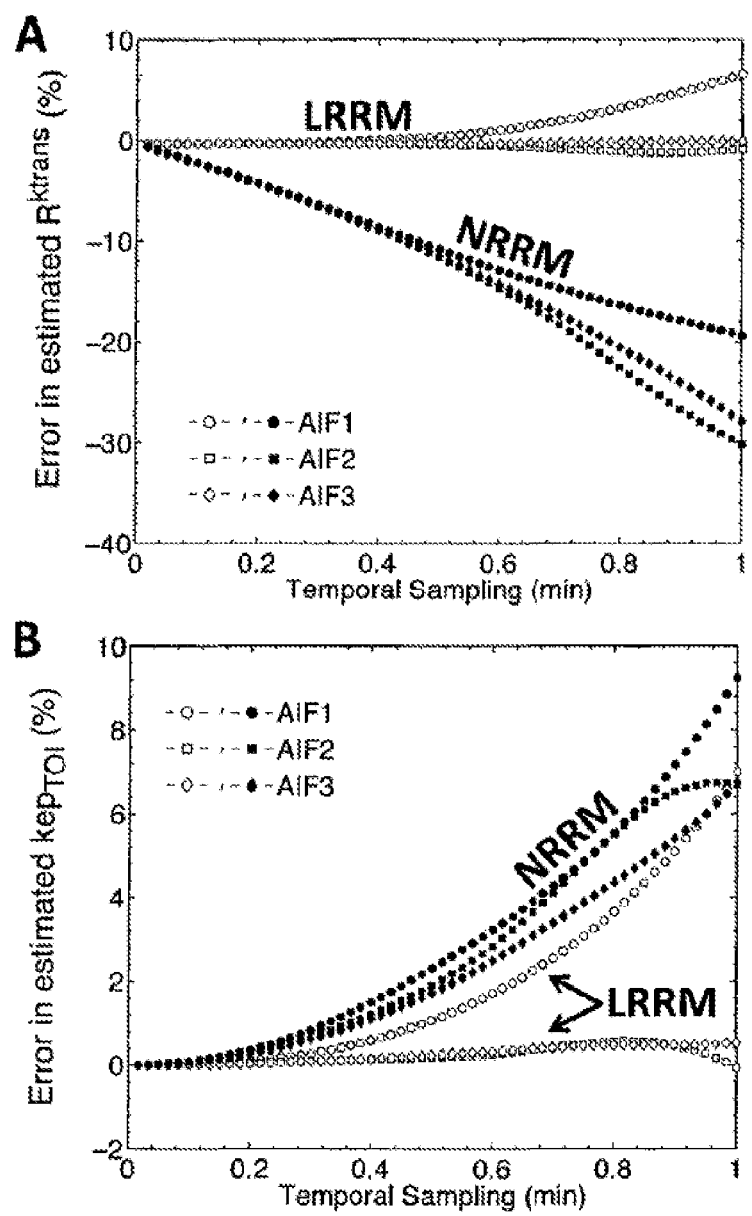
FIGS. 4-7 show the results of example computer simulations performed to evaluate the use of a linear model.

The estimated values of $R^{Ktrans}$ and $k_{ep,TOI}$ from these simulations were compared to their initial values used to create the simulated data. FIG. 4 shows the systematic errors as a function of temporal resolution and injection speed. As shown in FIG. 4, the NRRM systematically underestimated $R^{Ktrans}$ and overestimated $k_{ep,TOI}$, and these systematic errors became worse as the temporal sampling became slower. The results shown in FIG. 4 indicate that DCE-MRI with LRRM can produce accurate results with a moderate or fast injection speed, while DCE-MRI with NRRM cannot produce accurate results unless the temporal sampling is extremely fast.

Figure 5:
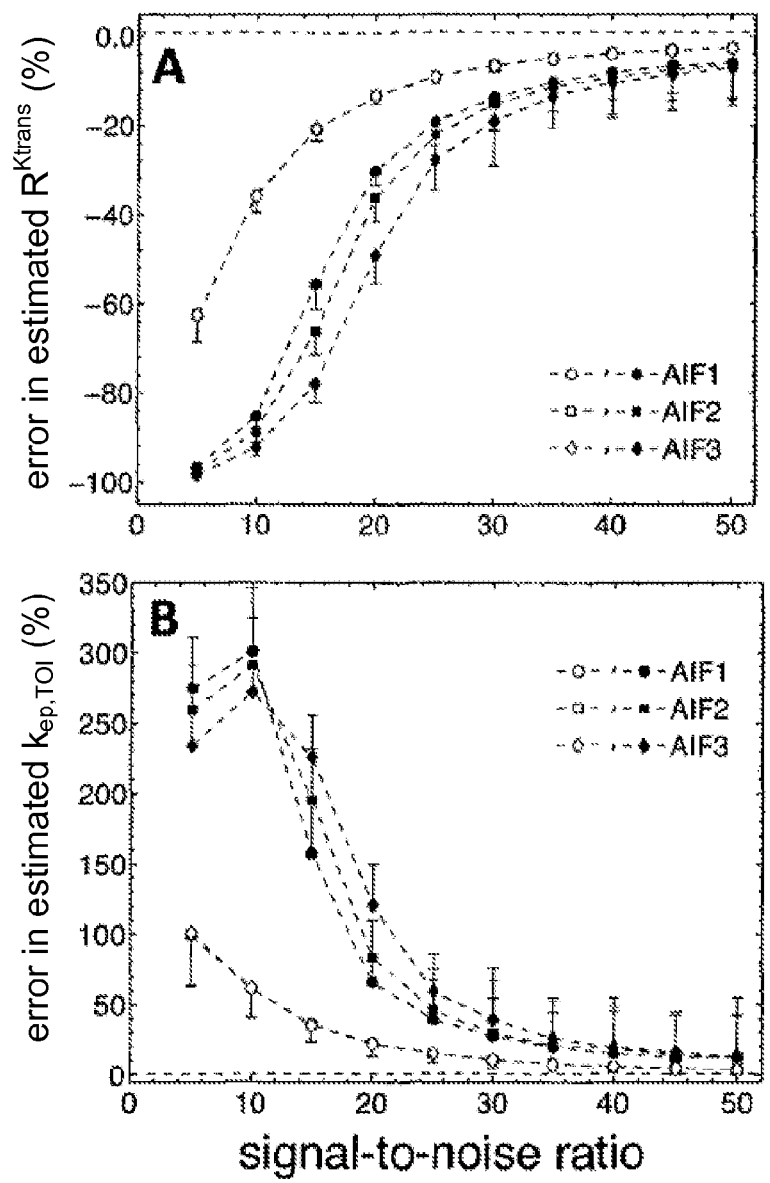

FIG. 5 shows the error in estimated $R^{Ktrans}$ and $k_{ep,TOI}$ as a function of SNR. As shown in FIG. 5, both the LRRM and NRRM showed greater average errors in estimated $R^{Ktrans}$ and $k_{ep,TOI}$ as the SNR decreased. Yet, the errors with LRRM were smaller than the errors with NRRM for all SNRs. The standard deviations of these results were also smaller when using LRRM relative to NRRM at SNR>10. Also, for a SNR of 60 these standard deviations were negligible for NRRM while these standard deviations were substantial for NRRM, indicating the LRRM provided more precise fittings to the data.

Figure 6:
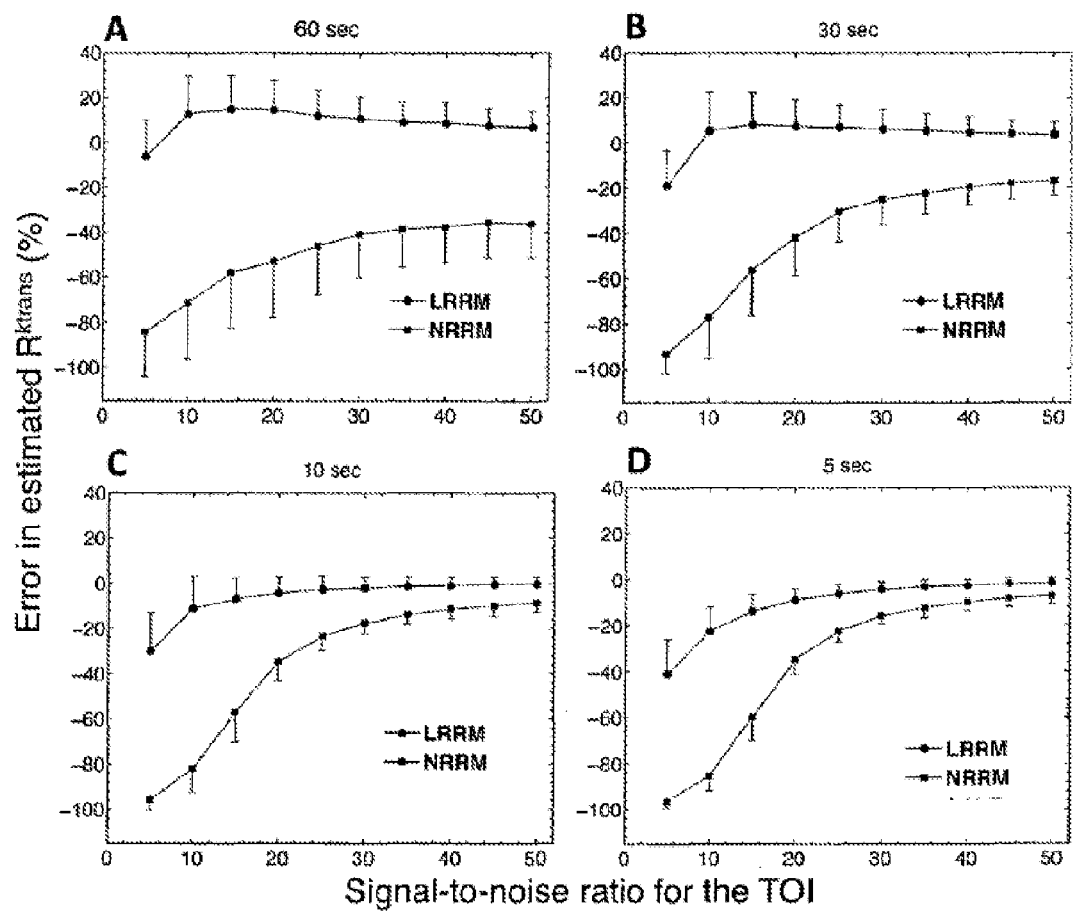

FIG. 6 shows the error in estimated $R^{Ktrans}$ as a function of SNR and temporal resolution. As shown in FIG. 6, the errors in estimating $R^{Ktrans}$ increased as the SNR decreased for both LRRM and NRRM. Yet, the errors in estimated $R^{Ktrans}$ with LRRM were smaller than the errors with NRRM for all SNRs. Also, the errors in estimated $R^{Ktrans}$ with NRRM were strongly dependent on temporal resolution while estimates with LRRM were relatively insensitive to temporal resolution. The results shown in FIG. 6 illustrate that DCE-MRI with LRRM can produce more precise results for estimated $R^{Ktrans}$ than NRRM, especially at low SNRs, and regardless of injection speeds.

Figure 7:
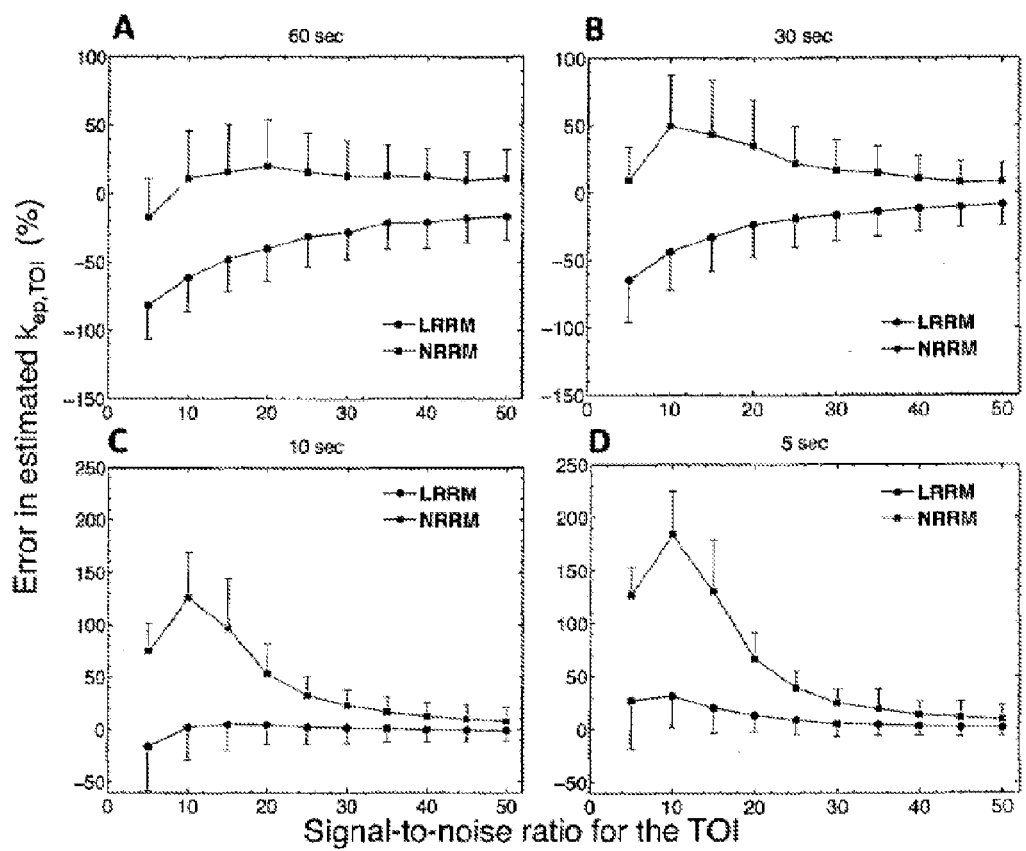

FIG. 7 shows the error in estimated $k_{ep,TOI}$ as a function of SNR and temporal resolution. As shown in FIG. 7, the errors in estimated $k_{ep,TOI}$ with LRRM were also smaller than errors with NRRM for fast temporal resolutions of 5 and 10 seconds, but the errors with LRRM were larger than errors with NRRM for slower temporal resolutions. Both the LRRM and NRRM produced errors in estimated $k_{ep,TOI}$ that were dependent on temporal resolution. These results demonstrated that DCE-MRI with LRRM can produce more precise results for estimated $k_{ep,TOI}$ than the NRRM at fast temporal resolutions.

The results of experiments also indicated that the LRRM may be more suitable than the NRRM for many clinical studies. For instance, results indicated that NRRM may only produce accurate and precise results when the temporal resolution is fast, which may not be feasible in all radiology clinics.

To experimentally compare the results of LRRM and NRRM, a female severe combined immunodeficiency (SCID) mouse weighing 21 grams was housed and maintained under specific pathogen-free conditions. The mouse was injected subcutaneously in the right flank with $10 \times 10^6$ MDA-231 cells in 0.1 mL saline. The tumor was measured every 2 to 3 days using electronic calipers and allowed to grow for 22 days to an average volume of 250 mm³ before initiating MRI studies.

The mouse was scanned 22 days after tumor implantation using a Bruker Biospec 7.0 T scanner that was equipped with a 72 mm birdcage coil (Bruker Biospin, Inc.). Before the imaging scan, the mouse was anesthetized with 1.5-2% isoflurane in $O_2$ carrier gas, a 27 G catheter was inserted in the tail vein and physiological monitoring leads were connected to monitor respiration rate and core body temperature during the MRI session. The mouse was kept at 37.0±0.2° C. during the MRI studies using warmed air that was controlled by an automated temperature-feedback system (SA Instruments, Inc.).

DCE-MRI studies were conducted by acquiring a set of 3 contiguous axial image slices through the xenograft flank tumor, and 3 axial image slices through the femoral artery. The orientation of these image slices were determined by acquiring $T_2$-weighted ($T_{2w}$) MR images with a RARE MRI protocol that used the following parameters: TR=1.0 sec, TE=8.2 msec, slice thickness=0.5 mm; matrix=128×128, FOV=3.5 cm², in-plane resolution=273 μm²; NEX=1, and RARE=4.

A parametric map of endogenous $T_1$ relaxation time, $R_1(0)$ with the same geometry as the $T_{2w}$ images, was obtained by acquiring a series of RARE-variable TR (RARE-VTR) images with the following parameters: TR=0.375, 0.75, 1.5, 3.0, and 6.0 sec, TE=9.07 msec, NEX=1, RARE factor=2, and fitting the data to Equation 21:

$$S = A \cdot \left[ \frac{\sin\alpha(1 - e^{(-TR \cdot R_1)})}{1 - e^{(-TR \cdot R_1)} \cdot \cos\alpha} \right] \quad (21)$$

where α is the flip angle (90 degrees in the experiment), and A is a constant that includes the proton density and scanner gain. It was assumed that TE<<$T_2^*$.

A series of $T_1$-weighted ($T_{1w}$) images were acquired for DCE-MRI analysis using a RARE MRI protocol with the same geometry as the $R_1(0)$ maps, and the following parameters was used: TR=250 msec, TE=8.2 msec, NEX=2 averages, a RARE factor=2. A total of 65 image sets were acquired for a total acquisition time of 34.66 min and a temporal resolution of 32 sec/image. After the fifth image set was acquired, 0.2 mmol/Kg Gd-DTPA (Magnevist™, Bayer Healthcare) was injected through the tail vein catheter in a total volume of 0.25 mL during 60 seconds. Finally, the $R_1(0)$ maps and Equation 21 were used to estimate $\Delta R_1(t)$ for each voxel within the TOI and the average $\Delta R_1(t)$ of the RR.

$$R_1(t) = \frac{1}{-TR} \cdot \ln\left[1 - \frac{S(t)}{S(0)}(1 - e^{(-TR \cdot R_1(0))})\right] \quad (22)$$

The $\Delta R_1(t)$ curves for the RR and TOI were fitted to the LRRM and NRRM to generate tumor parametric maps of $R^{Ktrans}$ and $k_{ep,TOI}$. The concentration of a contrast agent may be determined based on the effect of the contrast agent on water relaxation. The $T_1$ relaxation time and the concentration of the contrast agent are related through the following equations:

$$R_1(t) = r \cdot CA(t) + R_1(0) \quad (23)$$

$$\frac{R_1(t) - R_1(0)}{r} = \frac{\Delta R_1(t)}{r} = CA(t) \quad (24)$$

where $R_1(t)$ is the transverse relaxation rate ($1/T_1$) at each time point of the DCE-MRI experiment, CA(t) is the contrast agent concentration at that same time point, $R_1(0)$ is the native $R_1$ of the tissue before injection of the contrast agent, and r is the contrast agent relaxivity.

The time to calculate a parametric map of $R^{Ktrans}$ for a 128×128 image matrix was approximately 6.64 seconds using LRRM and 68.88 minutes using NRRM, using a typical notebook computer. Calculating a parametric map of $k_{ep,TOI}$ required similar calculation times. Therefore, the LRRM produced results approximately 620 times faster than NRRM.

Figure 8:
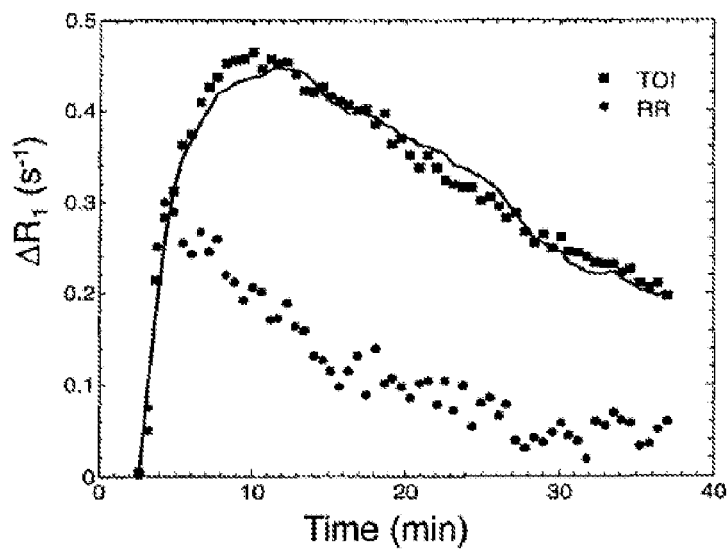
FIGS. 8-9 show the results of an example experiment performed to evaluate the use of a linear model.

FIG. 8 shows an experimental evaluation of the LRRM and NRRM. Using both the LRRM and NRRM to solve for $R^{Ktrans}$ and $k_{ep,TOI}$ and $k_{ep,RR}$ yielded results having a root mean squared error (RMSE) of 0.008 mM. The estimated parameters were comparable to those reported for other tumor types and muscle. As shown in FIG. 8, the LRRM and NRRM performed similarly when fitting data with high SNR, moderate temporal resolution, and moderate injection speed.

Figure 9:
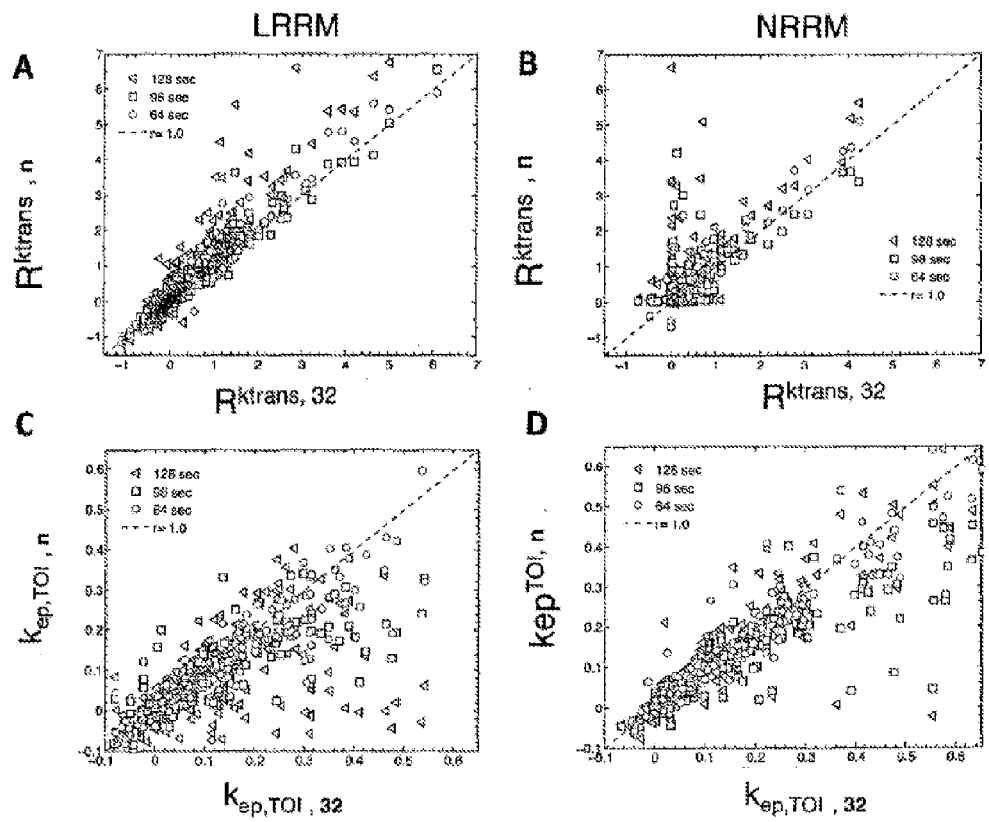

FIG. 9 shows the effect of temporal resolution on the accuracy of estimated $R^{Ktrans}$ and $k_{ep,TOI}$. The $\Delta R_1$ curves for each voxel and the reference region were down-sampled from their initial values of 32 sec to values of 64, 96, and 128 sec. $R^{Ktrans}$ and $k_{ep,TOI}$ were estimated with LRRM and NRRM at each temporal resolution. In FIG. 9, scatter plots showing the values at estimated at the slower temporal resolutions compared with values at 32 sec are presented. As shown in FIG. 9, when LRRM was used, $R^{Ktrans}$ and $k_{ep,TOI}$ estimated with slower resolution were highly correlated with $R^{Ktran,32s}$ and $k_{ep,TOI,32}$, while the NRRM estimated different $R^{Ktrans}$ and $k_{ep,TOI}$ at each temporal resolution. The trends are further illustrated with reference to the Spearmen correlation coefficients for the scatter plots that are shown in FIG. 9. For example, $R^{Ktrans,32}$ was highly correlated with $R^{Ktrans,128}$ when the LRRM was used (r=0.91), while the $R^{Ktrans,32}$ and $R^{Ktrans,128}$ estimated with NRRM showed a lower correlation (r=0.61). Thus, the experimental results show that LRRM is relatively insensitive to temporal resolution, while NRRM is more sensitive to temporal resolution.

iii. Reference Agent Model (RAM)

Another example of a linear model that may be determined at block 106 is the reference agent model. A detailed description of the RAM is now described.

In some applications, such as DCE-MRI, for example, the inability to account for an exact value of hematocrit in blood may lead to improperly estimated values of Cp(t) and $K^{trans}$.

For example, most DCE-MRI studies assume that the arterial hematocrit is 40%. However, the hematocrit decreases as vessel diameter decreases, so that hematocrit in tumor microvasculature, for example, ranges between 20%-80%.

The RAM compares the pharmacokinetics of two contrast agents in the same tissue, so that one contrast agent may be used as a reference for the second contrast agent. Because both contrast agents are located in the same tissue and experience the same hematocrit, a ratiometric comparison of biomedical images of both contrast agents is independent of the hematocrit. More generally, a ratiometric approach has potential to cancel other physiological characteristics as well.

Figure 10:
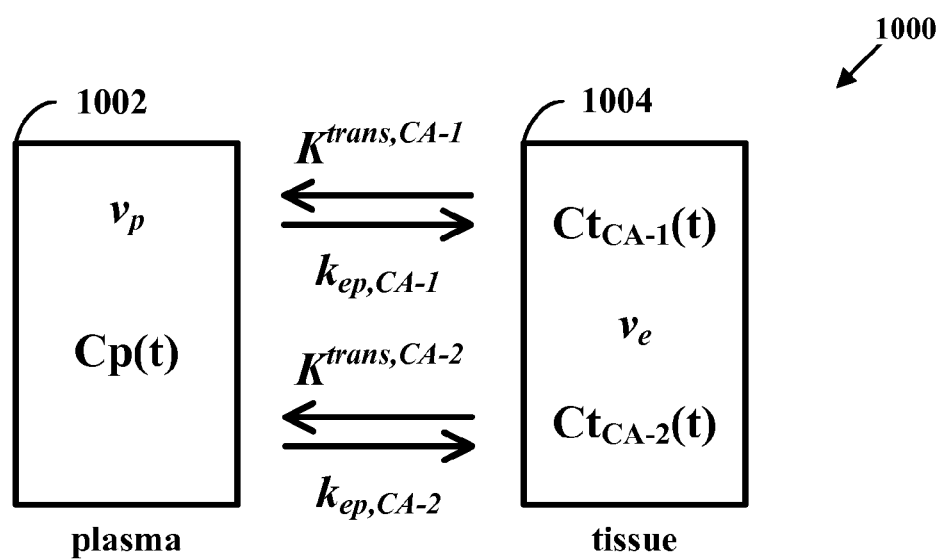
FIG. 10 is a conceptual illustration of another example model used for the quantitative analysis of biomedical image data.

The differential equations that describe the pharmacokinetic behavior of two contrast agents within the same tissue are described with respect to FIG. 10. FIG. 10 is a conceptual illustration 1000 of another example model used for the quantitative analysis of biomedical image data. Similar to the conceptual illustration 300 and example model of FIG. 3, two assumptions are made. A first assumption is that a human body may be represented by one or more compartments, into and out of which a contrast agent dynamically flows. A second assumption is that each compartment is well-mixed such that a contrast agent entering a compartment is immediately distributed uniformly throughout the compartment.

The model shown in FIG. 10 is a two-compartment model including a central compartment 1002 and peripheral compartment 1004. Intravascular extracellular volume fraction (plasma) is considered to be the central compartment 1002 and EES volume fraction (tissue) is considered to be the peripheral compartment 1004.

According to the RAM, a first contrast agent (CA-1) and a second contrast agent (CA-2) are introduced into the vasculature and diffuse into the EES in a reversible process characterized by a distribution rate constant ($K^{trans}$) and a redistribution rate constant ($k_{ep}=K^{trans}/v_e$). The following differential equations describe the process:

$$\frac{dCt_{CA-1}(t)}{dt} = K^{trans,CA-1} \cdot \frac{Cb_{CA-1}(t)}{(1-Hct)} - \frac{K^{trans,CA-1}}{v_e} \cdot Ct_{CA-1}(t) \quad (25)$$

$$\frac{dCt_{CA-2}(t)}{dt} = K^{trans,CA-2} \cdot \frac{Cb_{CA-2}(t)}{(1-Hct)} - \frac{K^{trans,CA-2}}{v_e} \cdot Ct_{CA-2}(t) \quad (26)$$

Equation 27 relates the concentration of a contrast agent in blood to the concentration of the contrast agent in plasma.

$$Cp(t) = \frac{Cb(t)}{(1-Hct)} \quad (27)$$

Assuming that $Cb_{CA-1}(t)$ is equal to $Cb_{CA-2}(t)$, Equation 25 can be solved for $Cp(t)$:

$$\frac{Cb(t)}{(1-Hct)} = \frac{1}{K^{trans,CA-2}} \cdot \frac{dCt_{CA-2}(t)}{dt} + \frac{1}{v_e} \cdot Ct_{CA-2}(t) \quad (28)$$

Substituting Equation 27 into Equation 24 then eliminates the dependence of the analysis on Cb(t) and Hct:

$$\frac{dCt_{CA-1}(t)}{dt} = \quad (29)$$

-continued
$$\frac{K^{trans,CA-1}}{K^{trans,CA-2}} \cdot \frac{dCt_{CA-2}(t)}{dt} + \frac{K^{trans,CA-1}}{v_e} \cdot [Ct_{CA-2}(t) - Ct_{CA-1}(t)]$$

Finally, integrating both sides of Equation 29 and assuming that the initial concentrations of CA-1 and CA-2 are equal to zero yields the working equation for the RAM:

$$Ct_{CA-1}(T) = \frac{K^{trans,CA-1}}{K^{trans,CA-2}} \cdot Ct_{CA-2}(T) + \frac{K^{trans,CA-1}}{v_e} \cdot \left[\int_0^T Ct_{CA-2}(t)\,dt - \int_0^T Ct_{CA-1}(t)\,dt\right] \quad (30)$$

$$Ct_{CA-1}(T) = R^{Ktrans} \cdot Ct_{CA-2}(T) + k_{ep,CA-1} \cdot \left[\int_0^T Ct_{CA-2}(t)\,dt - \int_0^T Ct_{CA-1}(t)\,dt\right] \quad (31)$$

Expressed in matrix form, Equation 31 is equal to Equation 32:

$$\vec{A} = \overline{M} \cdot \vec{b} \quad (32)$$

where $$\vec{A} = \begin{pmatrix} Ct_{CA-1}(T1) \\ Ct_{CA-1}(T2) \\ \vdots \\ Ct_{CA-1}(Tn) \end{pmatrix}; \vec{b} = \begin{pmatrix} R^{Ktrans} \\ k_{ep,CA-1} \end{pmatrix} \quad (33)$$

$$\overline{M} = \begin{pmatrix} Ct_{CA-2}(T1) & \left[\int_0^{T1} Ct_{CA-2}(t)\,dt - \int_0^{T1} Ct_{CA-1}(t)\,dt\right] \\ Ct_{CA-2}(T2) & \left[\int_0^{T2} Ct_{CA-2}(t)\,dt - \int_0^{T2} Ct_{CA-1}(t)\,dt\right] \\ \vdots & \vdots \\ Ct_{CA-2}(Tn) & \left[\int_0^{Tn} Ct_{CA-2}(t)\,dt - \int_0^{Tn} Ct_{CA-1}(t)\,dt\right] \end{pmatrix};$$

The elements of column two of the vector M in Equation 32 can be approximated by numerical integration. Equations 31 and 32, therefore, represent a system of linear equations, which can be solved for the elements of vector b. The RAM can also be expressed as a linear equation:

$$y = m \cdot x + b \quad (34)$$

where $$y = \frac{Ct_{CA-1}(T)}{Ct_{CA-2}(T)}; x = \frac{\left[\int_0^T Ct_{CA-2}(t)\,dt - \int_0^T Ct_{CA-1}(t)\,dt\right]}{Ct_{CA-2}(T)}; \quad (35)$$

$$m = k_{ep,CA-1}; b = R^{Ktrans}$$

Equations 34 and 35 can then be used to estimate $R^{Ktrans}$ and $k_{ep,CA-1}$ by linear regression fitting.

In one example, the application of a LLSQ algorithm to the linear model in block 108 of the method 100 may include applying a LLSQ algorithm to Equations 31 and 32. In another example, the application of a LLSQ algorithm to the linear model in block 108 of the method 100 may include applying a LLSQ algorithm to Equations 34 and 35.

As mentioned briefly above, if the flux of a contrast agent across a tissue endothelium has low permeability relative to flow, leans can be approximated by Equation 8:

$$K^{trans} = PS \cdot \rho \qquad (8)$$

where P is the total permeability of the capillary wall, S is the surface area per unit mass of tissue, and $\rho$ is the density of tissue.

In an example in which a biomedical imaging study is conducted with large molecule contrast agents (e.g., nanoemulsions of perfluorocarbons) that match the permeability-limited model, the ratio of $K^{trans}$ values for two large molecule contrast agents simultaneously detected in the same tissue can be expressed as $R^{Ktrans}$:

$$R^{Ktrans} = \frac{K^{trans, CA-1}}{K^{trans, CA-2}} = \frac{P_{CA-1} \cdot S \cdot \rho}{P_{CA-2} \cdot S \cdot \rho} = \frac{P_{CA-1}}{P_{CA-2}} \qquad (36)$$

where $P_{CA-1}$ and $P_{CA-2}$ are the apparent permeabilities of the tissue for CA-1 and CA-2 respectively.

$R^{Ktrans}$, $K^{trans, CA-1}$, $K^{trans, CA-2}$, $k_{ep,CA-1}$, $k_{ep,CA-2}$, and $v_e$ are all examples of PK parameters that may be determined based on a linear model, the RAM. In an example in which the RAM is used as the linear model of the method 100, $Ct_{CA-1}(t)$ and $Ct_{CA-2}(t)$ may be the first concentration-activity curve and the second concentration-activity curve. Thus, the first concentration-activity curve may indicate the concentration of a first contrast agent within an interest region of tissue, the TOI, and the second concentration-activity curve may indicate the concentration of a second contrast agent within the interest region of tissue.

iv. Simulation and Experimental Results Using RAM

Computer simulations and experiments were performed to test the use of the RAM in accordance with the method 100. The simulation results and experimental results for the RAM are described below. Again, the simulation and experimental results are provided as examples. Other results are also possible and the results presented herein should not be taken to be limiting in any way.

Computer simulations were used to study the effect of temporal resolution and statistical noise on the accuracy and precision of RAM. The AIF for $^{19}$F nanoemulsions used in the study were experimentally measured and fitted to the following equation:

$$C_p(t) = A \cdot e^{(-\alpha \cdot T)} + B \cdot e^{(-\beta \cdot T)} \qquad (36)$$

The estimated parameters $\alpha$ and $\beta$ were combined with previously reported values for A and B for nanoparticles of similar size to simulate the AIF from 0 to 30 min. The values for each parameter were A=24.0 KgL$^{-1}$; $\alpha$=16.54 min$^{-1}$; B=5.5 KgL$^{-1}$; and $\beta$=0.03935 min$^{-1}$ $Ct_{CA-1}(t)$ and $Ct_{CA-2}(t)$ curves were calculated using Equation 37:

$$C_t(T) = K^{trans} \int_0^T C_p(t) \cdot e^{\left[\frac{K^{trans}}{v_e}(T-t)\right]} dt \qquad (37)$$

with $K^{trans}$ equal to $8.2 \times 10^{-3}$ min$^{-1}$ and $4.3 \times 10^{-3}$ min$^{-1}$ for CA-1 and CA-2 respectively. The parameter $v_e$ was set to 0.5 mL/mL for both curves.

To test the effect of temporal resolution, the AIF, $Ct_{CA-1}(t)$, and $Ct_{CA-2}(t)$ were down-sampled from $\Delta t$=one second to $\Delta t$=0.5, 2.0, and 4.0 min. The combined effect of SNR and $\Delta t$ on accuracy and precision was studied by adding Gaussian noise to produce SNRs from 5 to 100.

Figure 11:
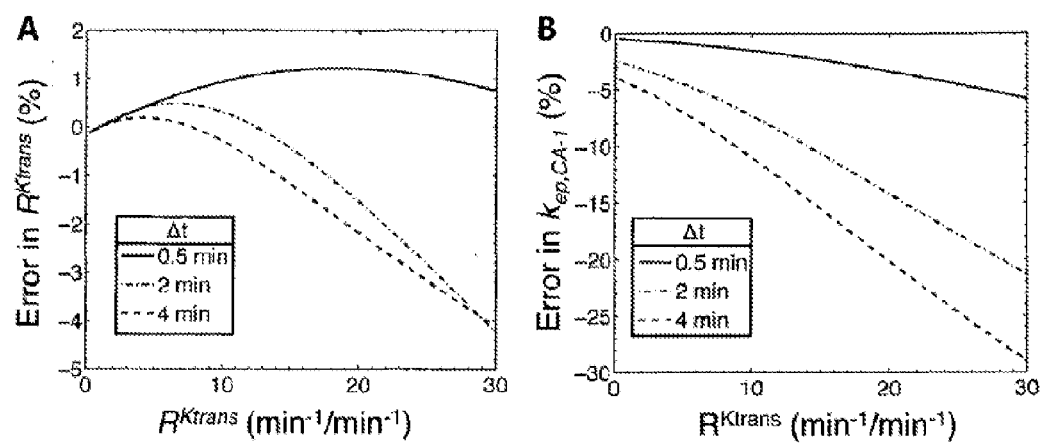
FIGS. 11-12 show the results of additional example computer simulations performed to evaluate the use of a linear model.

FIG. 11 shows the systematic error in $R^{Ktrans}$ and $k_{ep,CA-1}$ as a function of $R^{Ktrans}$ and temporal resolution. As shown in FIG. 11, the systematic error is greatest for slow temporal resolutions when $R^{Ktrans}$ is large. Additionally, when the PK of both contrast agents is comparable, creating a small to moderate value of $R^{Ktrans}$, a slow temporal resolution can accurately $R^{Ktrans}$ with a systematic error of less than 1%. FIG. 11 also shows that the systematic error in estimating $k_{ep,CA-1}$ is greater than 1% for all cases except the fastest temporal resolution.

Figure 12:
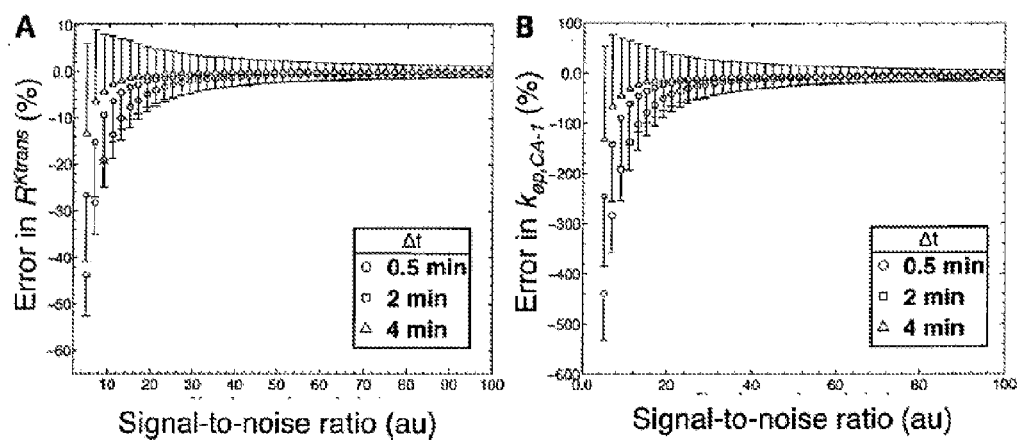

FIG. 12 shows the systematic error in $R^{Ktrans}$ and $k_{ep,CA-1}$ as a function of SNR. As shown in FIG. 12, error in estimating $R^{Ktrans}$ is less than 2% with SNR greater than 30:1, and less than 10% with SNR greater than 15:1. Additionally, the accuracy and precision of $k_{ep,CA-1}$ is also dependent on SNR. However, errors in $k_{ep,CA-1}$ are greater than errors in $R^{Ktrans}$, suggesting that estimating the ratiometric parameter $R^{Ktrans}$ has advantages relative to estimating $k_{ep,CA-1}$.

The results of experiments also indicated that RAM may be used for many clinical studies. To experimentally evaluate the use of RAM, a mouse model of a subcutaneous MDA-MB-231 tumor was used to perform in vivo $^{19}$F-DCE-MRI. A total of 18 multi-echo images were acquired by iterating the selective detection of perfluorinated-15-crown-ether (PCE) and perfluorooctane (PFO), which produced 9 images of each nanoemulsion that were unshuffled to show the temporal dependence of the $^{19}$F MRI signals from each nanoemulsion. The mixture of the nanoemulsions was injected during the acquisition of the second image, so that the first two images showed no significant $^{19}$F MR signal. Subsequent images showed a consistently increasing $^{19}$F MRI signal in the tumor. $^{19}$F MRI signals in the tumor were converted to $^{19}$F concentrations, and the RAM was used to estimate a value of $R^{Ktrans}$.

Figure 13:
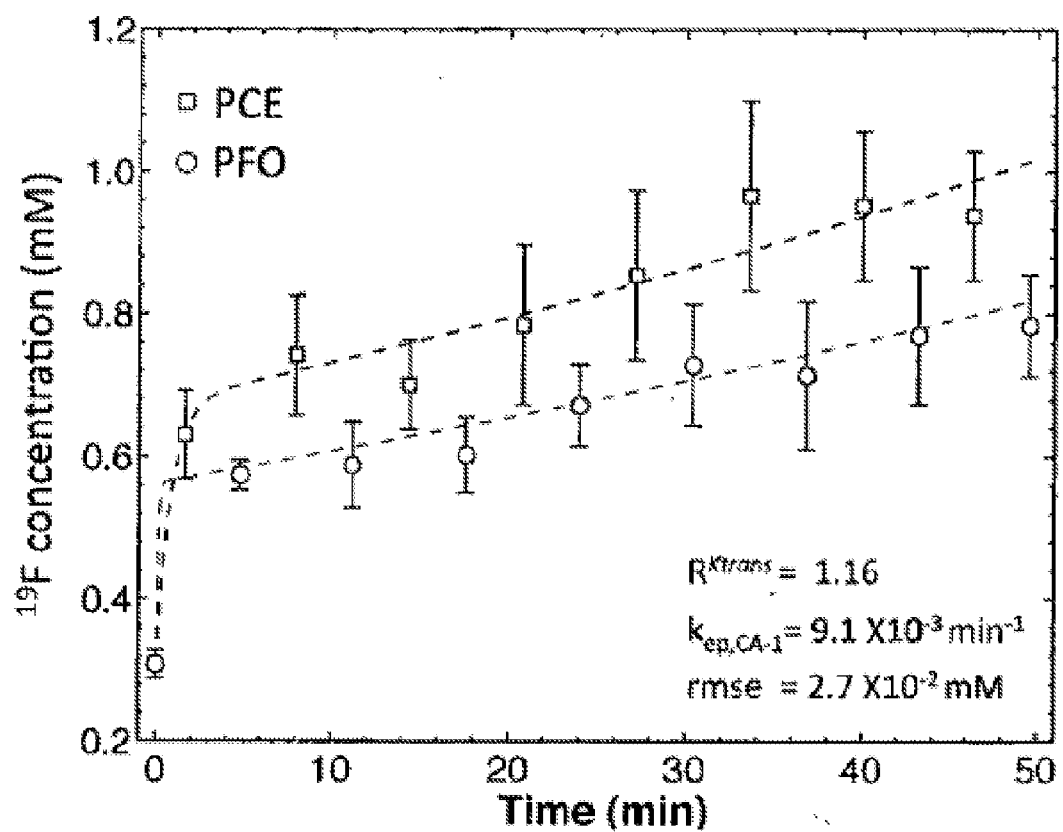
FIG. 13 shows the results of an additional example experiment performed to evaluate the use of a linear model.

FIG. 13 illustrates example concentration-activity curves for PCE and PFO. The example concentration-activity curves indicate the $^{19}$F concentrations of the two nanoemulsions. As shown in FIG. 13, an $R^{Ktrans}$ value of approximately 1 was determined. The $R^{Ktrans}$ value was expected because of the similar relative diameters of PCE and PFO. The RMSE of the RAM fitting was $2.7 \times 10^{-2}$ mM, which is approximately 1% error relative to the magnitudes of the $^{19}$F concentrations that were measured. Additionally, $k_{ep,CA-1}$ was estimated to be $9.1 \times 10^{-3}$ min$^{-1}$, which was in the range of expected values. Therefore, the in vivo $^{19}$F-DCE-MRI results demonstrated that two or more MRI contrast agents can selectively be detected during a single MRI scan session and $R^{Ktrans}$ can be measured with RAM.

c. Cause a Graphical Display to Provide a Value

At block 110, the method 100 includes cause a graphical display to provide a visual indication of the value of the at least one PK parameter. The graphical display may be any type of display device, such as a display device that is communicatively coupled to a computing system that is configured to perform the method 100. In one example, the method 100 may include causing the graphical display to provide the visual indication in response to the determining of the value of the PK parameter.

II. ADDITIONAL FUNCTIONS AND EXAMPLE APPLICATIONS

Figure 14:
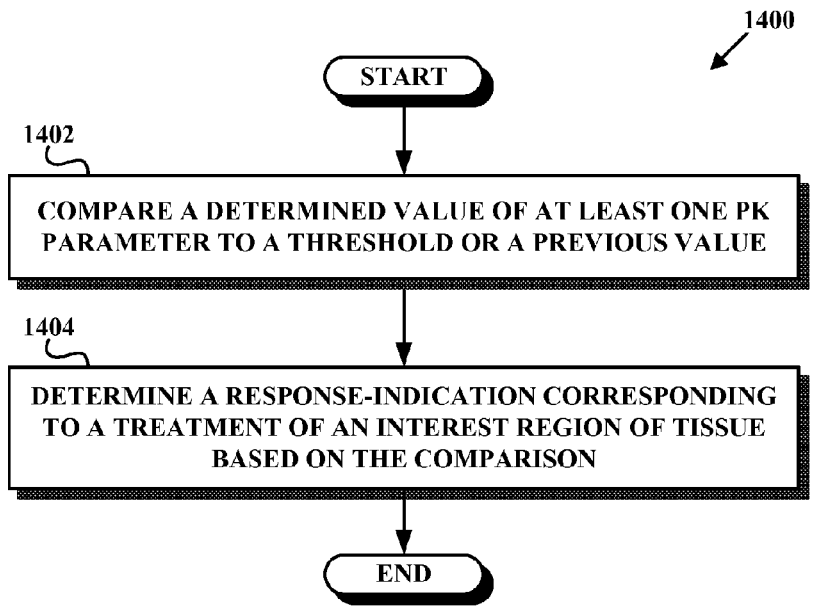
FIG. 14 is a flow chart of another example method that may be used with the example method of FIG. 1.
Figure 15:
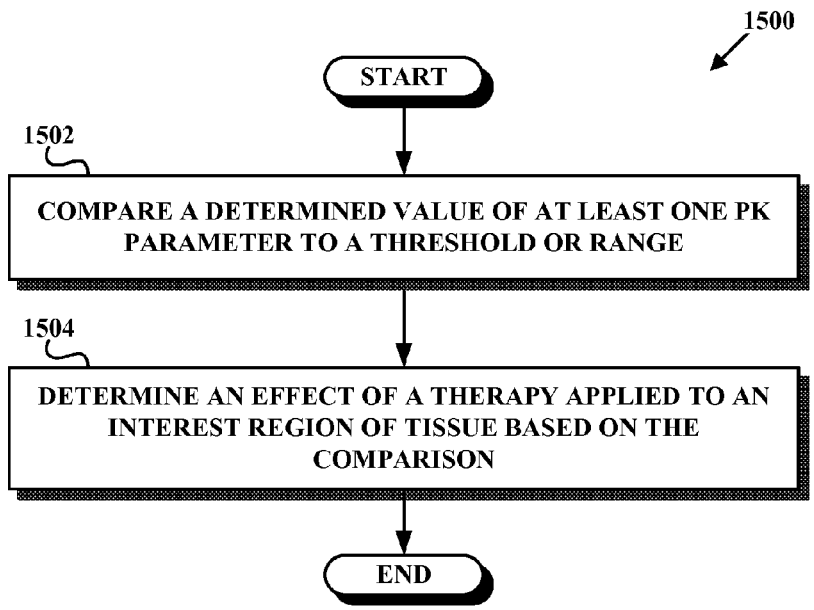
FIG. 15 is a flow chart of still another example method that may be used with the example method of FIG. 1.

In some examples, the method 100 of FIG. 1 may further include additional blocks. FIGS. 14 and 15 are flow charts of example methods 200 and 300. One or more blocks of the method 100 may be combined with any of the blocks of methods 1400 and/or 1500. For instance, the method 1400 or the method 1500 may be performed after block 110 of FIG. 1. Other configurations are also possible. Alternatively, either of the methods 1400 and 1500 may be performed independently of the method 100.

As shown in FIG. 2, initially, at block 1402, the method 1400 may include compare a determined value of at least one PK parameter to a threshold or a previous value. The determined value may be a value determined using the method 100, for example, or may be a value determined using other methods. In one example, the determined value may be a volume transfer constant, and the volume transfer constant may be compared to a volume transfer constant threshold or to a prior value of a volume transfer constant determined at an early time period. The comparison may determine, for instance, whether the determined value is greater than or less than the threshold or previous value.

At block 1404, the method 1400 may include determine a response-indication corresponding to a treatment of an interest region of tissue based on the comparison. For instance, the interest region of tissue may be a tumor, and the response-indication may be an indication of whether the tumor is responding to an anti-angiogenic therapy. In one example, if the comparison indicates that a determined volume transfer constant is less than a previously determined volume transfer constant, the response-indication may be that the tumor is responding positively to the anti-angiogenic therapy.

The methods of the invention may thus be used, for example, to diagnose cancer in a subject. In one embodiment, the cancer comprises a solid tumor. Exemplary tumor types that can be diagnosed using the methods of the invention include, but are not limited to, lung cancer, breast cancer, bladder cancer, thyroid cancer, liver cancer, pleural cancer, pancreatic cancer, ovarian cancer, cervical cancer, testicular cancer, colon cancer, anal cancer, bile duct cancer, gastrointestinal carcinoid tumors, esophageal cancer, gall bladder cancer, rectal cancer, appendix cancer, small intestine cancer, stomach (gastric) cancer, renal cancer, cancer of the central nervous system, skin cancer, choriocarcinomas; head and neck cancers, osteogenic sarcomas, B-cell lymphoma, non-Hodgkin's lymphoma, Burkitt's lymphoma, fibrosarcoma, neuroblastoma, glioma, and melanoma. The subject may be any suitable subject, including a mammal such as a human. The subject may be any subject with one or more risk factors for cancer, or who is otherwise identified by an attending physician as in need of a test for diagnosing cancer. In one exemplary embodiment, a subject "at risk of breast cancer" is any subject considered to be in a risk group for breast cancer. In one embodiment, the subject is a woman. In other embodiments, the subject has one or more of a lump in their breast tissue, lymph nodes, or armpit; changes in breast size or shape; skin dimpling; nipple inversion; spontaneous single-nipple discharge; a family/personal history of breast cancer; or is a carrier of a mutation in the BRCA or other gene that predisposes one to breast cancer. Based on the teachings herein and the level of skill in the art, it will be apparent to those of skill in the art how to identify subjects at risk of other cancers.

The methods of the invention may further be used, for example, to assess a response of a subject with cancer to a prescribed anti-cancer treatment, including but not limited to radiation therapy, chemotherapy (i.e., mechlorethamine, cyclophosphamide, chlorambucil, ifosfamide, azathioprine, mercaptopurine, taxanes, vincristine, vinblastine, paclitaxel, imatinib, gefitinib, etc.), anti-angiogenic therapy (ex: bevacizumab), hormonal therapy, monoclonal antibody therapy (trastuzumab, rituximab, etc.), and photodynamic therapy. In these embodiments, the methods are performed at a first time point (for example, prior to initiating therapy), and at a second time point (for example, after one or more rounds of treatment), and a change a PK parameter between the first and the second time point provides a measure of the subject's response to treatment. Based on the results of the methods in this embodiment, an attending physician may recommend, for example, (i) modifying the therapy to be administered to the subject (increased dosage, decreased dosage, increased frequency of administration, decreased frequency of administration, etc.), (ii) switching the subject to a different therapy, or (iii) maintaining a current course of therapy.

In other examples, treatment for ischemia, revascularization, inflammatory disease, infection, or other conditions may be evaluated using the method 1400. For instance, a change in a PK parameter may correspond to an increased or decreased blood perfusion in a tissue, which may be used to determine whether the tissue is responding to a treatment for ischemia, revascularization, inflammation, infection, or other condition. By way of non-limiting example, "inflammatory disease" refers to a disease or disorder characterized or caused by inflammation. "Inflammation" refers to a local response to cellular injury that is marked by capillary dilatation, leukocytic infiltration, redness, heat, and pain that serves as a mechanism initiating the elimination of noxious agents and of damaged tissue. The site of inflammation may include the lungs, the pleura, a tendon, a lymph node or gland, the uvula, the vagina, the brain, the spinal cord, nasal and pharyngeal mucous membranes, a muscle, the skin, bone or bony tissue, a joint, the urinary bladder, the retina, the cervix of the uterus, the canthus, the intestinal tract, the vertebrae, the rectum, the anus, a bursa, a follicle, and the like. Such inflammatory diseases include, but are not limited to, inflammatory bowel disease, rheumatoid diseases (e.g., rheumatoid arthritis), other arthritic diseases (e.g., acute arthritis, acute gouty arthritis, bacterial arthritis, chronic inflammatory arthritis, degenerative arthritis (osteoarthritis), infectious arthritis, juvenile arthritis, mycotic arthritis, neuropathic arthritis, polyarthritis, proliferative arthritis, psoriatic arthritis, venereal arthritis, viral arthritis), fibrositis, pelvic inflammatory disease, acne, psoriasis, actinomycosis, dysentery, biliary cirrhosis, Lyme disease, heat rash, Stevens-Johnson syndrome, mumps, *pemphigus vulgaris*, and blastomycosis. Inflammatory bowel diseases are chronic inflammatory diseases of the gastrointestinal tract which include, without limitation, Crohn's disease, ulcerative colitis, and indeterminate colitis. Rheumatoid arthritis is a chronic inflammatory disease primarily of the joints, usually polyarticular, marked by inflammatory changes in the synovial membranes and articular structures and by muscle atrophy and rarefaction of the bones.

The described systems and methods may also be used to aid in the prognosis of a subject suffering from cancer, ischemia, revascularization, inflammatory disease, infection, or other conditions. For example, the method 1500, alone or in any combination with one or more of the blocks of method 100, may be used to determine a subject's prognosis when blood perfusion is abnormal (e.g., more than normal in the case of tumor angiogenesis, and less than normal in the case of ischemia, revascularization, or inflammation and infection). As used herein, "prognosis" may, for example, refer to a likelihood that the subject will or will not respond to a particular treatment regimen for the relevant indication.

Initially, at block 1502, the method 1500 includes compare a determined value of at least one PK parameter to a threshold or range. The determined value may be a value determined using the method 100, for example, or may be a value determined using other methods. In one example, the determined value may be a volume transfer constant, and the volume transfer constant may be compared to a volume transfer constant threshold or range. The comparison may determine, for instance, whether the determined value is within a predetermined range or a position of the determined value within the predetermined range (e.g., a percentile).

At block 1504, the method 1500 includes determine an effect of a therapy applied to an interest region of tissue based on the comparison. In one instance, the method 1500 may be used to evaluate the early response of a therapy, within days or hours of starting the therapy, for example. This may be advantageous relative to waiting for longer periods of time to evaluate an effect, and then realizing that the therapy was ineffective.

In other examples, the described systems and methods may be used to predict the effect of a therapy applied to treat an abnormal condition of blood perfusion, before the therapy is initiated. In still other examples, the described systems and methods may be used to evaluate the blood perfusion of patients who are at risk for some diseases, such as cancer. For example, individuals who have had a condition in the past may be at risk of developing a particular disease that can be evaluated for. As another example, a female patient with strong genetic markers for breast cancer, who has dense breast tissue, smokes, and has a history of breast cancer in her family, may have enough risk factors to justify screening the female patient for breast cancer.

The described applications are not meant to be limiting, and other examples are also possible. For instance, it is contemplated that the LRRM can be applied to the study of other phenomena. The derivation of the RAM is one application of LRRM. In line with this strategy, the LRRM can also be applied to many other events which can also be characterized by coupled ordinary differential equations, for example, quantitative measurement of enzymatic activity using hyperpolarized MRI, receptor binding, and dynamic perfusion in non-biological systems.

In a further embodiment of all embodiments disclosed herein, the methods may further comprise treating the subject based on the results obtained through carrying out the methods of the invention. As used herein. "treating" means accomplishing one or more of the following: (a) reducing or eliminating the relevant disorder, such as cancer, in the subject; (b) reducing the severity of one or more symptoms of the disorder; (c) limiting or preventing development of one or more symptoms of the disorder; (d) inhibiting worsening of one or more symptoms of the disorder; and (e) limiting or preventing recurrence of one or more symptoms of the disorder in subjects that were previously symptomatic for the relevant symptom. The specific treatment to be provided to the subject can be determined by an attending physician based on all factors, including the relevant condition, the subject's specific circumstances, and the results obtained using the methods of the invention.

III. EXAMPLE SYSTEM

FIG. 16 is a simplified block diagram of an example system 1600 in which the present methods may be implemented. It should be understood that this and other arrangements described herein are set forth only as examples. Those skilled in the art will appreciate that other arrangements and elements (e.g., machines, interfaces, functions, orders, and groupings of functions, etc.) can be used instead and that some elements may be omitted altogether. Further, many of the elements described herein are functional entities that may be implemented as discrete or distributed components in conjunction with other components and in any suitable combination and location. Various functions described herein as being performed by one or more entities may be carried out by hardware, firmware, and/or software. For instance, various functions may be carried out by a processor executing instructions stored in memory.

As shown in FIG. 16, example system 1600 may include a computing system 1602 that is coupled to a display 1604. Generally, the computing system 1602 may be configured to receive biomedical images 1606 or biomedical image data from another device (not shown). For instance, the computing system 1602 may receive the biomedical images 1606 from a database, a server, another computing system, or a biomedical imaging device. Therefore, in some examples, the computing system 1602 may be communicatively coupled to a biomedical imaging device that is configured to provide the biomedical images 1606. In other examples, the computing system 1602 may be configured to receive or access the biomedical images from a database. Other examples may exist.

The biomedical images 1606 may take the form of any suitable type of biomedical imaging data. For example, the biomedical images 106 may be magnetic resonance imaging (MRI) images such as dynamic contrast enhanced magnetic resonance imaging (DCE-MRI) images or $^{19}$F MRI images. In another example, the biomedical images may be optical images. In other examples, the biomedical images may be ultrasonic images. Thus, the biomedical images may include any type of biomedical images or biomedical image data.

The computing system 1602 may be configured to carry out the functions described herein. For example, the computing system 1602 may be configured to carry out any of the functions described with respect to the example methods of FIGS. 1, 14, and 15 described above. As one example, the computing system 1602 may be configured to process the biomedical images 1606 and determine one or more concentration-activity curves based on the biomedical images 1606. For instance, an individual voxel or individual pixel (or groups of voxels or pixels) may be analyzed in one or more of the biomedical images 1606 to determine a concentration of a contrast agent over time.

The contrast agent may be any type of substance used to enhance the contrast of structures or fluids during medical imaging. For example, the contrast agent may be used to enhance the visibility of blood vessels. For MRI examples, the contrast agent may be a substance that alters the relaxation times of atoms within body tissues after oral or intravenous administration. As an example, the contrast agent may be a paramagnetic contrast agent, such as a gadolinium-based compound, that alters the $T_1$ relaxation time of extracellular water. In another example, the contrast agent may include fluorine. For instance, the contrast agent may be a $^{19}$F nanoemulsion. For optical imaging examples, the contrast agent may include a colored dye. Other types of contrast agents are also contemplated.

The computing system 1602 may be further configured to fit the concentration-activity curves to one or more pharmacokinetic models in order to estimate at least one pharmacokinetic (PK) parameter. For instance, the computing system 1602 may be configured to determine a perfusion, permeability, and/or extracellular volume fraction by fitting two concentration activity-curves to a linear model based on application of a linear least square fitting (LLSQ) algorithm.

The computing system may also be configured to cause the display 1604 to provide a visual indication of the value of at least one determined PK parameter. The display 1604 may be any type of graphical display device employing one or more of any underlying display technologies (e.g., cathode ray tube display, light-emitting diode display, liquid crystal display, etc.).

Figure 17:
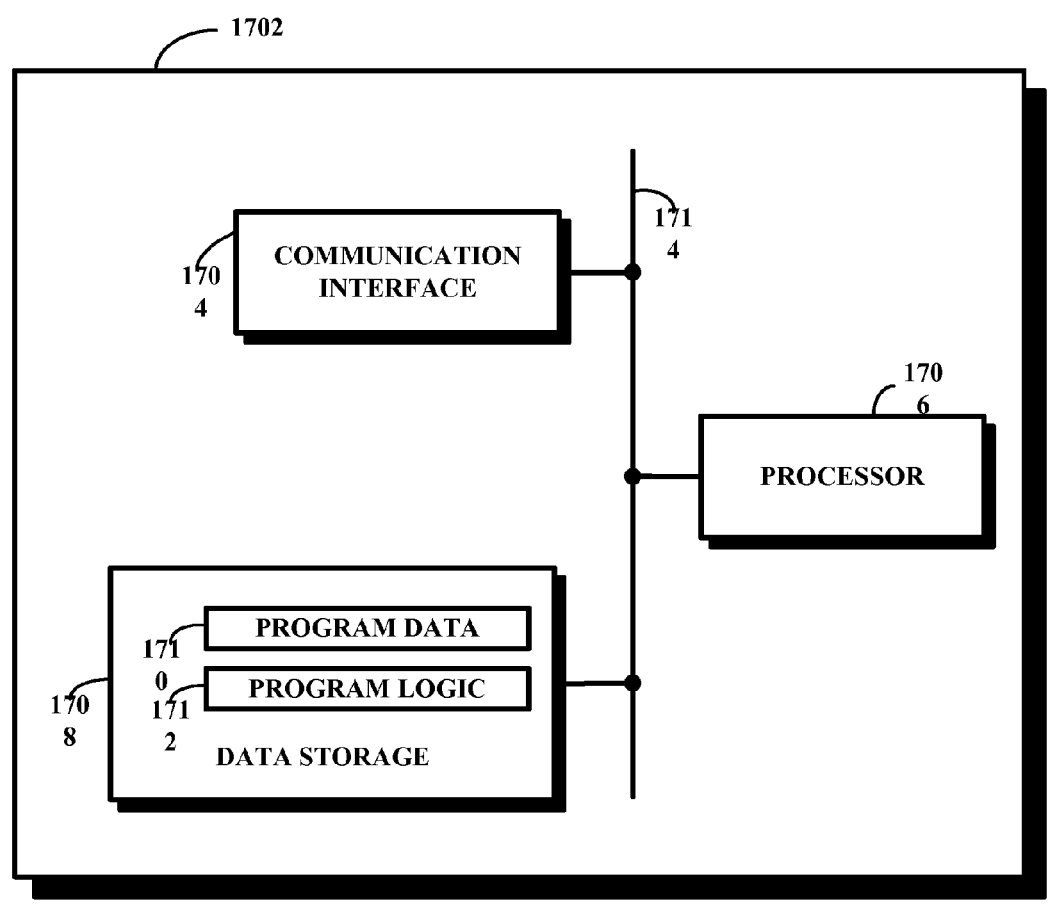
FIG. 17 is a simplified block diagram of an example computing device.

The computing system 1602 of FIG. 16 may be implemented in, include, or take the form of a computing device or components of a computing device, such as computing device 1702 shown in FIG. 17. As shown, computing device 1702 may include, without limitation, a communication interface 1704, processor 1706, and data storage 1708, all of which may be communicatively linked together by a system bus, network, and/or other connection mechanism 1714.

Communication interface 1704 typically functions to communicatively couple computing device 1702 to other devices and/or entities. As such, communication interface 1704 may include a wired (e.g., Ethernet, without limitation) and/or wireless (e.g., CDMA and/or Wi-Fi, without limitation) communication interface, for communicating with other devices and/or entities. Communication interface 1704 may also include multiple interfaces, such as one through which computing device 1702 sends communication, and one through which computing device 1702 receives communication. Communication interface 1704 may be arranged to communicate according to one or more types of communication protocols mentioned herein and/or any others now known or later developed.

Processor 1706 may include one or more general-purpose processors (such as INTEL processors or the like) and/or one or more special-purpose processors (such as digital-signal processors or application-specific integrated circuits). To the extent processor 1706 includes more than one processor, such processors could work separately or in combination. Further, processor 1706 may be integrated in whole or in part with wireless-communication interface 1704 and/or with other components.

Data storage 1708, in turn, may include one or more volatile and/or non-volatile storage components, such as magnetic, optical, or organic memory components. As shown, data storage 1708 may include program data 1710 and program logic 1712 executable by processor 1706 to carry out various functions described herein. Although these components are described herein as separate data storage elements, the elements could just as well be physically integrated together or distributed in various other ways. For example, program data 1710 may be maintained in data storage 208 separate from program logic 1712, for easy updating and reference by program logic 1712.

Program data 1710 may include various data used by computing device 1702 in operation. As an example, program data 1710 may include information pertaining to biomedical image data and/or pharmacokinetic models. Similarly, program logic 1712 may include any additional program data, code, or instructions necessary to carry out the functions described herein. For example, program logic 1712 may include instructions executable by processor 1706 for causing computing device 1702 to carry out any of those functions described herein.

IV. EXAMPLE COMPUTER READABLE MEDIUM

Figure 18:
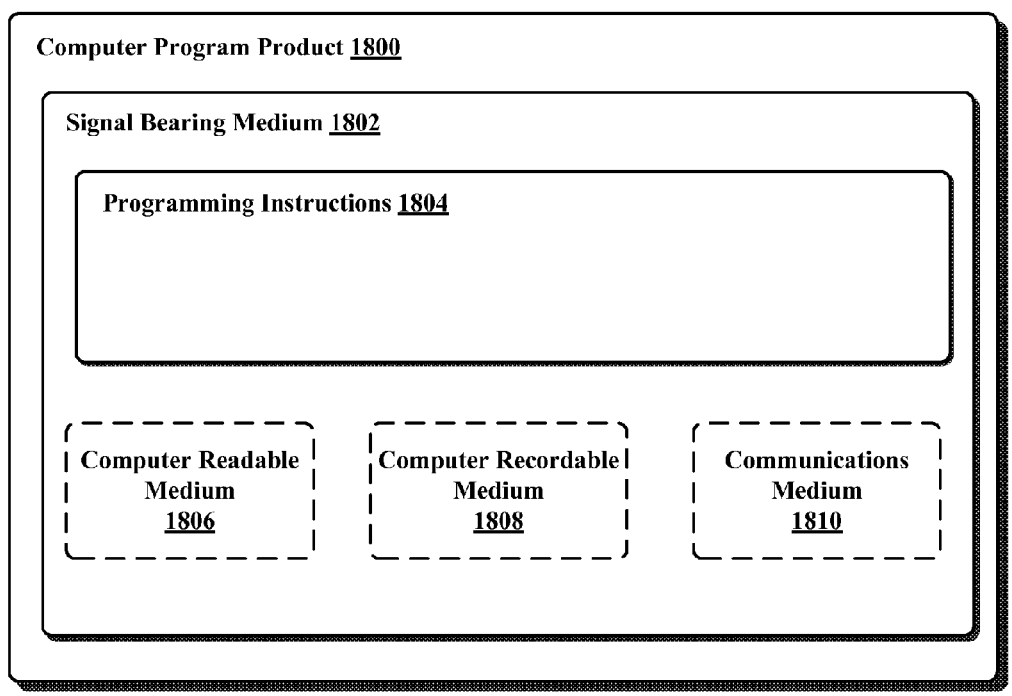
FIG. 18 is a schematic illustrating a conceptual partial view of an example computer program product that includes a computer program for executing a computer process on a computing device.

In some embodiments, the disclosed methods may be implemented by computer program logic, or instructions, encoded on a non-transitory computer-readable storage media in a machine-readable format, or on other non-transitory media or articles of manufacture. FIG. 18 is a schematic illustrating a conceptual partial view of an example computer program product that includes a computer program for executing a computer process on a computing device, arranged according to at least some embodiments presented herein.

In one embodiment, the example computer program product 1800 is provided using a signal bearing medium 1802. The signal bearing medium 1802 may include one or more programming instructions 1804 that, when executed by one or more processors may provide functionality or portions of the functionality described herein. In some examples, the signal bearing medium 1802 may encompass a computer-readable medium 1806, such as, but not limited to, a hard disk drive, a Compact Disc (CD), a Digital Video Disk (DVD), a digital tape, memory, etc. In some implementations, the signal bearing medium 1802 may encompass a computer recordable medium 1808, such as, but not limited to, memory, read/write (R/W) CDs, R/W DVDs, etc. In some implementations, the signal bearing medium 1802 may encompass a communications medium 1810, such as, but not limited to, a digital and/or an analog communication medium (e.g., a fiber optic cable, a waveguide, a wired communications link, a wireless communication link, etc.). Thus, for example, the signal bearing medium 1802 may be conveyed by a wireless form of the communications medium 1810. It should be understood, however, that computer-readable medium 1806, computer recordable medium 1808, and communications medium 1810 as contemplated herein are distinct mediums and that, in any event, computer-readable medium 1808 is a physical, non-transitory, computer-readable medium.

The one or more programming instructions 1804 may be, for example, computer executable and/or logic implemented instructions. In some examples, a computing device such as that shown in FIG. 17 may be configured to provide various operations, functions, or actions in response to the programming instructions 1804 conveyed to the computing device by one or more of the computer readable medium 1806, the computer recordable medium 1808, and/or the communications medium 1810.

The non-transitory computer readable medium could also be distributed among multiple data storage elements, which could be remotely located from each other. The computing device that executes some or all of the stored instructions could be a computing device, such as the computing device illustrated in FIG. 17. Alternatively, the computing device that executes some or all of the stored instructions could be another computing device.

V. CONCLUSION

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:
1. A computer-implemented method, comprising:
   determining, based on a set of biomedical images, a first concentration-activity curve and a second concentration-activity curve, wherein each of the first concentration-activity curve and the second concentration-activity curve indicates a concentration of a respective contrast agent within a respective region of tissue;
   determining a value of at least one pharmacokinetic (PK) parameter based on the first concentration-activity curve and the second concentration-activity curve, wherein determining the value of the at least one PK parameter comprises:
(i) determining a linear model that relates the first concentration-activity curve to the second concentration-activity curve, wherein the linear model comprises the at least one PK parameter; and
(ii) determining the value of the at least one PK parameter based on application of a linear least square fitting (LLSQ) algorithm to the linear model; and
causing a graphical display to provide a visual indication of the value of the at least one PK parameter.

2. The computer-implemented method of claim 1:
wherein the first concentration-activity curve indicates a concentration of a first contrast agent in an interest region of tissue; and
wherein the second concentration-activity curve indicates a concentration of the first contrast agent in a reference region of tissue.

3. The computer-implemented method of claim 1, wherein the first contrast agent comprises a paramagnetic contrast agent.

4. The computer-implemented method of claim 1:
wherein the first concentration-activity curve indicates a concentration of a first contrast agent in an interest region of tissue; and
wherein the second concentration-activity curve indicates a concentration of a second contrast agent in the interest region of tissue.

5. The computer-implemented method of claim 4, wherein each of the first contrast agent and the second contrast agent comprise fluorine.

6. The computer-implemented method of claim 4:
wherein the first contrast agent comprises a first color; and
wherein the second contrast agent comprises a second color.

7. The computer-implemented method of claim 4:
wherein the first contrast agent is responsive to a biomarker; and
wherein the second contrast agent is unresponsive to the biomarker.

8. The computer-implemented method of claim 1, wherein the at least one PK parameter comprises one or more of the following: a volume transfer constant ($K^{trans}$) and an extravascular extracellular volume fraction ($v_e$).

9. The computer-implemented method of claim 1, wherein the set of biomedical images comprises a set of magnetic resonance images.

10. The computer-implemented method of claim 1, wherein the set of biomedical images comprises a set of optical images.

11. The computer-implemented method of claim 1, further comprising determining a response-indication corresponding to a treatment of an interest region of tissue based on the value of the at least one PK parameter.

12. The computer-implemented method of claim 11, wherein the treatment comprises one or more of the following: an anti-angiogenic therapy, a treatment for ischemia, a treatment for revascularization, and a treatment for inflammation and infection.

13. The computer-implemented method of claim 1, further comprising determining that an interest region of tissue is a malignant tumor based on the value of the at least one PK parameter.

14. A non-transitory computer-readable medium having instructions stored thereon, the instructions comprising:
determining, based on a set of biomedical images, a first concentration-activity curve and a second concentration-activity curve, wherein each of the first concentration-activity curve and the second concentration-activity curve indicates a concentration of a respective contrast agent within a respective region of tissue;
determining a value of at least one pharmacokinetic (PK) parameter based on the first concentration-activity curve and the second concentration-activity curve, wherein determining the value of the at least one PK parameter comprises:
(i) determining a linear model that relates the first concentration-activity curve to the second concentration-activity curve, wherein the linear model comprises the at least one PK parameter; and
(ii) determining the value of the at least one PK parameter based on application of a linear least square fitting (LLSQ) algorithm to the linear model; and
causing a graphical display to provide a visual indication of the value of the at least one PK parameter.

15. The non-transitory computer-readable medium of claim 14:
wherein the first concentration-activity curve indicates a concentration of a first contrast agent in an interest region of tissue; and
wherein the second concentration-activity curve indicates a concentration of the first contrast agent in a reference region of tissue.

16. The non-transitory computer-readable medium of claim 14:
wherein the first concentration-activity curve indicates a concentration of a first contrast agent in an interest region of tissue; and
wherein the second concentration-activity curve indicates a concentration of a second contrast agent in the interest region of tissue.

17. A system comprising:
at least one processor;
a computer-readable medium; and
program instructions stored on the computer-readable medium and executable by the at least one processor to:
determine, based on a set of biomedical images, a first concentration-activity curve and a second concentration-activity curve, wherein each of the first concentration-activity curve and the second concentration-activity curve indicates a concentration of a respective contrast agent within a respective region of tissue; and
determine a value of at least one pharmacokinetic (PK) parameter based on the first concentration-activity curve and the second concentration-activity curve, wherein determining the value of the at least one PK parameter comprises:
(i) determining a linear model that relates the first concentration-activity curve to the second concentration-activity curve, wherein the linear model comprises the at least one PK parameter; and
(ii) determining the value of the at least one PK parameter based on application of a linear least square fitting (LLSQ) algorithm to the linear model.

18. The system of claim 17:
wherein the first concentration-activity curve indicates a concentration of a first contrast agent in an interest region of tissue; and
wherein the second concentration-activity curve indicates a concentration of the first contrast agent in a reference region of tissue.

19. The system of claim 17:
wherein the first concentration-activity curve indicates a concentration of a first contrast agent in an interest region of tissue; and
wherein the second concentration-activity curve indicates a concentration of a second contrast agent in the interest region of tissue.

20. The system of any of claim 17, further comprising a dynamic contrast enhanced magnetic resonance imaging (DCE-MRI) device communicatively coupled to the system, wherein the DCE-MRI device is configured to provide the set of biomedical images to the system.

* * * * *